(12) United States Patent
Mohan et al.

(10) Patent No.: US 8,589,413 B1
(45) Date of Patent: Nov. 19, 2013

(54) CONCEPT-BASED METHOD AND SYSTEM FOR DYNAMICALLY ANALYZING RESULTS FROM SEARCH ENGINES

(75) Inventors: Rengaswamy Mohan, Jacksonville, FL (US); Usha Mohan, Jacksonville, FL (US); David Sha, Jacksonville, FL (US)

(73) Assignee: IxReveal, Inc., Jacksonville, FL (US)

( * ) Notice: Subject to any disclaimer, the term of this patent is extended or adjusted under 35 U.S.C. 154(b) by 978 days.

(21) Appl. No.: 10/695,426

(22) Filed: Oct. 29, 2003

Related U.S. Application Data

(63) Continuation-in-part of application No. 10/393,677, filed on Mar. 19, 2003, now Pat. No. 7,194,483, and a continuation-in-part of application No. 10/087,053, filed on Mar. 1, 2002, now Pat. No. 6,970,881.

(60) Provisional application No. 60/422,237, filed on Oct. 29, 2002, provisional application No. 60/435,926, filed on Dec. 19, 2002.

(51) Int. Cl.
  G06F 7/00 (2006.01)
  G06F 17/30 (2006.01)
  G06F 15/18 (2006.01)

(52) U.S. Cl.
  USPC .............................. 707/749; 707/794; 706/46

(58) Field of Classification Search
  USPC ............. 707/1–3, 102, 103, 749, 794; 706/46
  See application file for complete search history.

(56) References Cited

U.S. PATENT DOCUMENTS

| | | | |
|---|---|---|---|
| 4,839,853 A | 6/1989 | Deerwester et al. | |
| 5,278,980 A | 1/1994 | Pedersen et al. | |

(Continued)

FOREIGN PATENT DOCUMENTS

| | | |
|---|---|---|
| GB | 2399666 | 9/2004 |
| WO | WO 99/18825 | 9/1999 |

(Continued)

OTHER PUBLICATIONS

Arents, H.C. et al., "Concept-Based Retrieval of Hypermedia Information: From Term Indexing to Semantic Hyperindexing," *Information Processing & Management*, vol. 29, No. 3, pp. 373-386, May-Jun. 1993.

(Continued)

*Primary Examiner* — Apu Mofiz
*Assistant Examiner* — Chelcie Daye

(57) ABSTRACT

A method, system and computer program for identifying a relationship between concepts in an object includes (i) selecting the object for inclusion in an initial subset of objects obtained as an output of a search engine; (ii) storing the object in a database; (iii) creating an index of the object; (iv) analyzing the index to extract two concepts relating to the object; (v) highlighting the two concepts within object; (vi) calculating a strength of a relationship between the two concepts using a ratio; (vii) storing the two concepts and the strength of the relationships between the two concepts in a database; (viii) presenting the two concepts and the strength in an interface that has a concept matrix; and (ix) repeating steps vi through viii for every possible pairwise combination of concepts within the index. The relationship can be the two concepts both occur in the same object; the two concepts occur near each other within the same object; and the two concepts occur near each other and in a particular order within the same object. The ratio can be a support ratio; an occurrence ratio; and a combined ratio. An additional concept can be added to the index; all the concepts can be grouped in the index by concept type; and complex meta-structures can be created. The concept type can be a part of speech; a geographic region; a person; a group of persons; a business unit; an organization; an action; a process; a product; a service; a subject; and a category.

21 Claims, 14 Drawing Sheets

(56) References Cited

U.S. PATENT DOCUMENTS

| | | |
|---|---|---|
| 5,295,256 A | 3/1994 | Bapat |
| 5,418,951 A | 5/1995 | Damashek |
| 5,488,725 A | 1/1996 | Turtle et al. |
| 5,519,865 A | 5/1996 | Kondo et al. |
| 5,555,408 A | 9/1996 | Fujisawa et al. |
| 5,592,667 A | 1/1997 | Bugajski |
| 5,617,578 A | 4/1997 | Kroll et al. |
| 5,619,709 A | 4/1997 | Caid et al. |
| 5,634,051 A | 5/1997 | Thomson |
| 5,727,950 A | 3/1998 | Cook et al. |
| 5,761,496 A | 6/1998 | Hattori |
| 5,768,578 A | 6/1998 | Kirk et al. |
| 5,794,178 A * | 8/1998 | Caid et al. ............... 704/9 |
| 5,819,260 A | 10/1998 | Lu et al. |
| 5,832,182 A | 11/1998 | Zhang et al. |
| 5,832,470 A | 11/1998 | Morita et al. |
| 5,867,799 A | 2/1999 | Lang et al. |
| 5,884,305 A | 3/1999 | Kleinberg et al. |
| 5,905,498 A | 5/1999 | Diament |
| 5,920,864 A | 7/1999 | Zhao |
| 5,924,090 A | 7/1999 | Krellenstein |
| 5,926,811 A | 7/1999 | Miller et al. |
| 5,933,822 A | 8/1999 | Braden-Harder et al. |
| 5,953,726 A * | 9/1999 | Carter et al. ............. 715/853 |
| 5,963,940 A | 10/1999 | Liddy et al. |
| 5,983,214 A | 11/1999 | Lang et al. |
| 5,987,446 A | 11/1999 | Corey et al. |
| 5,987,447 A | 11/1999 | Chang et al. |
| 6,006,221 A | 12/1999 | Liddy et al. |
| 6,026,388 A | 2/2000 | Liddy et al. |
| 6,028,605 A | 2/2000 | Conrad et al. |
| 6,029,161 A | 2/2000 | Lang et al. |
| 6,038,561 A | 3/2000 | Snyder et al. |
| 6,055,526 A | 4/2000 | Ambroziak |
| 6,078,924 A | 6/2000 | Ainsbury et al. |
| 6,101,491 A | 8/2000 | Woods |
| 6,101,492 A | 8/2000 | Jacquemin et al. |
| 6,101,515 A | 8/2000 | Wical et al. |
| 6,122,628 A | 9/2000 | Castelli et al. |
| 6,182,063 B1 | 1/2001 | Woods |
| 6,189,002 B1 | 2/2001 | Roitblat |
| 6,195,657 B1 | 2/2001 | Rucker et al. |
| 6,199,034 B1 | 3/2001 | Wical |
| 6,199,067 B1 | 3/2001 | Geller |
| 6,233,575 B1 | 5/2001 | Agrawal et al. |
| 6,236,987 B1 | 5/2001 | Horowitz et al. |
| 6,256,633 B1 | 7/2001 | Dharap |
| 6,263,335 B1 | 7/2001 | Paik et al. |
| 6,289,382 B1 | 9/2001 | Bowman-Amuah |
| 6,300,957 B1 | 10/2001 | Rao et al. |
| 6,308,175 B1 | 10/2001 | Lang et al. |
| 6,314,420 B1 | 11/2001 | Lang et al. |
| 6,321,228 B1 | 11/2001 | Crandall et al. |
| 6,327,593 B1 | 12/2001 | Goiffon |
| 6,330,563 B1 | 12/2001 | Heckerman |
| 6,366,908 B1 | 4/2002 | Chong et al. |
| 6,385,600 B1 | 5/2002 | McGuinness et al. |
| 6,385,602 B1 | 5/2002 | Tso et al. |
| 6,411,924 B1 | 6/2002 | de Hita et al. |
| 6,424,973 B1 | 7/2002 | Baclawski |
| 6,453,312 B1 | 9/2002 | Goiffon et al. |
| 6,453,339 B1 | 9/2002 | Schultz et al. |
| 6,477,524 B1 | 11/2002 | Taskiran et al. |
| 6,496,818 B1 | 12/2002 | Ponte |
| 6,502,045 B1 | 12/2002 | Biagiotti |
| 6,510,406 B1 | 1/2003 | Marchisio |
| 6,513,036 B2 | 1/2003 | Fruensgaard et al. |
| 6,523,028 B1 | 2/2003 | DiDomizio et al. |
| 6,539,376 B1 | 3/2003 | Sundaresan et al. |
| 6,564,210 B1 | 5/2003 | Korda et al. |
| 6,567,797 B1 | 5/2003 | Schuetze et al. |
| 6,567,804 B1 | 5/2003 | Ramasamy et al. |
| 6,581,068 B1 | 6/2003 | Bensoussan et al. |
| 6,611,825 B1 | 8/2003 | Billheimer et al. |
| 6,615,199 B1 | 9/2003 | Bowman-Amuah |
| 6,615,253 B1 | 9/2003 | Bowman-Amuah |
| 6,628,312 B1 | 9/2003 | Rao et al. |
| 6,629,095 B1 | 9/2003 | Wagstaff et al. |
| 6,629,097 B1 | 9/2003 | Keith |
| 6,633,868 B1 | 10/2003 | Min et al. |
| 6,636,242 B2 | 10/2003 | Bowman-Amuah |
| 6,636,848 B1 | 10/2003 | Aridor et al. |
| 6,640,244 B1 | 10/2003 | Bowman-Amuah |
| 6,640,249 B1 | 10/2003 | Bowman-Amuah |
| 6,643,661 B2 | 11/2003 | Polizzi et al. |
| 6,651,058 B1 * | 11/2003 | Sundaresan et al. ............. 707/6 |
| 6,654,761 B2 | 11/2003 | Tenev et al. |
| 6,665,662 B1 | 12/2003 | Kirkwood et al. |
| 6,675,159 B1 | 1/2004 | Lin et al. |
| 6,678,700 B1 | 1/2004 | Moore et al. |
| 6,684,207 B1 | 1/2004 | Greenfield et al. |
| 6,701,305 B1 | 3/2004 | Holt et al. |
| 6,711,585 B1 | 3/2004 | Copperman et al. |
| 6,715,145 B1 | 3/2004 | Bowman-Amuah |
| 6,728,707 B1 | 4/2004 | Wakefield et al. |
| 6,732,097 B1 | 5/2004 | Wakefield et al. |
| 6,732,098 B1 | 5/2004 | Wakefield et al. |
| 6,738,765 B1 | 5/2004 | Wakefield et al. |
| 6,741,988 B1 | 5/2004 | Wakefield et al. |
| 6,742,015 B1 | 5/2004 | Bowman-Amuah |
| 6,766,316 B2 | 7/2004 | Caudill et al. |
| 6,778,979 B2 | 8/2004 | Grefenstette et al. |
| 6,810,394 B2 * | 10/2004 | Coutts et al. ............... 707/713 |
| 6,839,699 B2 * | 1/2005 | Chan ............................. 706/45 |
| 6,842,906 B1 | 1/2005 | Bowman-Amuah |
| 6,862,713 B1 | 3/2005 | Kraft et al. |
| 6,892,189 B2 | 5/2005 | Quass et al. |
| 6,895,406 B2 | 5/2005 | Fables et al. |
| 6,901,555 B2 | 5/2005 | Hida et al. |
| 6,928,398 B1 | 8/2005 | Fang et al. |
| 6,941,321 B2 | 9/2005 | Schuetze et al. |
| 6,944,626 B2 | 9/2005 | Cameron et al. |
| 6,961,731 B2 | 11/2005 | Holbrook |
| 6,970,881 B1 | 11/2005 | Mohan et al. |
| 6,976,016 B2 | 12/2005 | Chang et al. |
| 6,976,017 B1 | 12/2005 | Getchius |
| 7,007,034 B1 | 2/2006 | Hartman et al. |
| 7,010,752 B2 | 3/2006 | Ly |
| 7,019,744 B2 | 3/2006 | Anderson |
| 7,023,453 B2 | 4/2006 | Wilkinson et al. |
| 7,194,460 B2 | 3/2007 | Komamura |
| 7,194,483 B1 | 3/2007 | Mohan et al. |
| 7,349,895 B2 | 3/2008 | Liu et al. |
| 7,505,989 B2 | 3/2009 | Gardner et al. |
| 7,536,413 B1 | 5/2009 | Mohan et al. |
| 7,627,588 B1 | 12/2009 | Mohan et al. |
| 7,650,405 B2 | 1/2010 | Hood et al. |
| 7,676,485 B2 | 3/2010 | Elfayoumy |
| 7,788,251 B2 | 8/2010 | Carlson |
| 7,831,559 B1 | 11/2010 | Mohan et al. |
| 7,890,514 B1 | 2/2011 | Mohan et al. |
| 2001/0011266 A1 | 8/2001 | Baba |
| 2002/0007373 A1 | 1/2002 | Blair et al. |
| 2002/0016800 A1 | 2/2002 | Spivak et al. |
| 2002/0069203 A1 | 6/2002 | Dar et al. |
| 2002/0091696 A1 | 7/2002 | Craft et al. |
| 2002/0107844 A1 | 8/2002 | Cha et al. |
| 2002/0120609 A1 | 8/2002 | Lang et al. |
| 2002/0129015 A1 | 9/2002 | Caudill et al. |
| 2003/0014403 A1 | 1/2003 | Chandrasekar et al. |
| 2003/0018659 A1 | 1/2003 | Fuks et al. |
| 2003/0041056 A1 * | 2/2003 | Bossemeyer et al. ............. 707/3 |
| 2003/0069882 A1 | 4/2003 | Nieswand et al. |
| 2003/0074177 A1 | 4/2003 | Bowen |
| 2003/0149586 A1 | 8/2003 | Chen et al. |
| 2003/0163454 A1 | 8/2003 | Jacobsen et al. |
| 2003/0187632 A1 | 10/2003 | Menich |
| 2004/0002959 A1 | 1/2004 | Alpert et al. |
| 2004/0019588 A1 | 1/2004 | Doganata et al. |
| 2004/0049478 A1 | 3/2004 | Jasper et al. |
| 2004/0083206 A1 | 4/2004 | Wu et al. |
| 2004/0167870 A1 | 8/2004 | Wakefield et al. |
| 2004/0167883 A1 | 8/2004 | Wakefield et al. |
| 2004/0167884 A1 | 8/2004 | Wakefield et al. |

(56) References Cited

U.S. PATENT DOCUMENTS

| | | |
|---|---|---|
| 2004/0167885 A1 | 8/2004 | Wakefield et al. |
| 2004/0167886 A1 | 8/2004 | Wakefield et al. |
| 2004/0167887 A1 | 8/2004 | Wakefield et al. |
| 2004/0167907 A1 | 8/2004 | Wakefield et al. |
| 2004/0167908 A1 | 8/2004 | Wakefield et al. |
| 2004/0167909 A1 | 8/2004 | Wakefield et al. |
| 2004/0167910 A1 | 8/2004 | Wakefield et al. |
| 2004/0167911 A1 | 8/2004 | Wakefield et al. |
| 2004/0199498 A1 | 10/2004 | Kapur et al. |
| 2004/0215634 A1 | 10/2004 | Wakefield et al. |
| 2004/0254916 A1 | 12/2004 | Dettinger et al. |
| 2005/0021290 A1 | 1/2005 | Velipasaoglu |
| 2005/0021357 A1 | 1/2005 | Schuetze et al. |
| 2005/0021512 A1 | 1/2005 | Koenig |
| 2005/0060340 A1 | 3/2005 | Sommerfield |
| 2005/0065967 A1 | 3/2005 | Schuetze et al. |
| 2005/0091197 A1 | 4/2005 | Dettinger |
| 2005/0091198 A1 | 4/2005 | Dettinger |
| 2005/0108256 A1 | 5/2005 | Wakefield et al. |
| 2005/0149496 A1 | 7/2005 | Mukherjee et al. |
| 2005/0154692 A1 | 7/2005 | Jacobsen et al. |
| 2005/0154711 A1 | 7/2005 | McConnell |
| 2005/0160080 A1 | 7/2005 | Dawson |
| 2005/0160082 A1 | 7/2005 | Dawson |
| 2005/0166152 A1 | 7/2005 | Hida et al. |
| 2005/0192824 A1 | 9/2005 | Schuetze et al. |
| 2005/0192926 A1 | 9/2005 | Liu et al. |
| 2005/0193055 A1 | 9/2005 | Angel et al. |
| 2005/0234879 A1 | 10/2005 | Zeng et al. |
| 2005/0246320 A1 | 11/2005 | Benysh et al. |
| 2005/0278323 A1 | 12/2005 | Horvitz et al. |
| 2006/0015486 A1 | 1/2006 | Nomiyama et al. |
| 2006/0047649 A1 | 3/2006 | Liang |
| 2006/0074836 A1 | 4/2006 | Gardner et al. |
| 2006/0100854 A1 | 5/2006 | Ance et al. |
| 2006/0106793 A1 | 5/2006 | Liang |
| 2006/0161423 A1 | 7/2006 | Scott et al. |
| 2007/0033221 A1 | 2/2007 | Copperman et al. |
| 2007/0113292 A1 | 5/2007 | Kao et al. |
| 2007/0192272 A1 | 8/2007 | Elfayoumy |
| 2008/0065603 A1 | 3/2008 | Carlson |
| 2008/0288431 A1 | 11/2008 | Colson et al. |
| 2010/0262620 A1 | 10/2010 | Mohan et al. |

FOREIGN PATENT DOCUMENTS

| | | |
|---|---|---|
| WO | WO 00/063841 | 10/2000 |
| WO | WO 01/22280 | 3/2001 |
| WO | WO 02/39254 | 5/2002 |
| WO | WO 03/040892 | 5/2003 |
| WO | WO 2004/053645 | 6/2004 |
| WO | WO 2005/069881 | 8/2005 |
| WO | WO 2007/047252 | 4/2007 |

OTHER PUBLICATIONS

Belew, R.K., "A connectionist approach to conceptual information retrieval," *ICAIL*, pp. 116-126, May 27-29, 1987.
Bhatia, S.K. and Deogun, J.S., "Conceptual Clustering in Information Retrieval," *IEEE Trans. on Systems, Man, and Cybernetics—Part B*, vol. 28, No. 3, pp. 427-436, Jun. 1998.
Crouch, C. and Yang, B., "Experiments in Automatic Statistical Thesaurus Construction," *Proc. of the Fifteenth Annual International ACM SIGIR Conference on Research and Development in Information Retrieval*, pp. 77-88, Jun. 21-24, 1992.
Deerwester, S. et al., "Indexing by Latent Semantic Analysis," *Journal of the American Society for Information Science*, vol. 41, No. 6, pp. 391-407, Sep. 1990.
Dumais, S. et al., "Inductive Learning Algorithms and Representations for Text Categorization," *Proc. of the Seventh International Conference on Information and Knowledge Management*, pp. 148-155, ACM Press, 1998.
Dumais, S. et al., "Optimizing Search by Showing Results in Context," *SIGHCHI'01*, vol. 3, No. 1, pp. 277-284, Mar. 31-Apr. 5, 2001.
Fagan, J. L., "Automatic Phrase Indexing for Document Retrieval," *Proc. of the Tenth Annual International ACM SIGIR Conference on Research and Development in Information Retrieval*, pp. 91-101, Jun. 3-5, 1987.
Feldman, R., "Tutorial 4. Mining Unstructured Data", *KDD-99 Tutorial Notes*, pp. 182-236, ACM Press, 1999.
Finkelstein, L. et al., "Placing Search in Context: The Concept Revisited," *Tenth International Conference on World Wide Web*, pp. 406-414, May 1-5, 2001.
Giger, H.P., "Concept Based Retrieval in Classical IR Systems", *Proc. of the Eleventh Annual International ACM SIGIR Conference on Research and Development in Information Retrieval*, pp. 275-289, May 1998.
Haveliwala, T.H., "Topic-Sensitive PageRank," *Eleventh International World Wide Web Conference*, pp. 517-526, May 7-11, 2002.
Jain, A.K. et al. "Data Clustering: A Review", *ACM Computing Surveys*, vol. 31, No. 3, pp. 264-323, Sep. 1999.
Jang, H. W.Park, S.Y., "Keyfact Concept for an Information Retrieval System," *Proc. of Natural Language Processing Pacific Rim Symposium*, pp. 510-513, Dec. 4-7, 1995.
Jun, M.S. and Park, S.Y., "Keyfact-Based Information Retrieval System," *International Symposium on Digital Library*, pp. 521-524, 1997.
Kolda, T.G. and O'Leary, D.P., "A Semidiscrete Matrix Decomposition for Latent Semantic Indexing in Information Retrieval," *ACM Transactions on Information Systems*, vol. 16, No. 4, pp. 322-346, Oct. 1998.
Kritzstein, B., "Starlight: Knowledge Management on a Whole New Plane," *Chemical and Biological Defense Info Analysis Center Newsletter*, vol. 5, No. 4, pp. 10-12, Fall 2004.
Lawrence, S., "Context in Web Search," *Bulletin of the Technical Committee on Data Engineering*, IEEE Computer Society, vol. 23, No. 3, pp. 25-32, Sep. 2000.
Leake, D.B. and Scherle, R., "Towards Context-Based Search Engine Selection," *Sixth International Conference on Intelligent User Interfaces*, Santa Fe, New Mexico, pp. 109-112, Jan. 14-17, 2001.
Nigam, K. et al., "Learning to Classify Text From Labeled and Unlabeled Documents," Proc. of AAAI-98, 15th Conference of the American Association for Artificial Intelligence, pp. 792-799, Jul. 26-30, 1998.
Salton, G. et al., "A Vector Space Model for Automatic Indexing," *Communications of the ACM*, vol. 18, No. 11, pp. 613-620, Nov. 1975.
Singh, L. et al., "Generating Association Rules from Semi-Structured Documents Using an Extended Concept Hierarchy," *Proc. of the Sixth International Conference on Information and Knowledge Management*, pp. 193-200, Nov. 10-14, 1997.
Yang, Y. et al. "An Evaluation of Statistical Approaches to Text Categorization," *Information Retrieval*, vol. 1, pp. 69-90, 1999.
Ankerst, et al., "DataJewel" Tightly Integrating Visualization with Temporal Data Mining, ICDM Workshop on Visual Data Mining, Melbourne, FL, p. 19, Nov. 19-23, 2003.
Boeing Frontiers, "Text Mining for Golden Results," p. 50, Jul. 2005.
Botev et al., "Context-sensitive keyword search and ranking for XML" Eighth International Workshop on the Web and databases, p. 6, Jun. 16-17, 2005.
European Search Report issued in EP Application No. 06816600.8, Jun. 15, 2009, 6 pgs.
Codd, E.F. et al., "Providing OLAP to User-Analysts: An IT Mandate," Hyperion Solutions Corporation, CA, 1993 pp. 1-20.
Grotevant, S.M. and Foth D. "The Power of Multidimensional Analysis (OLAP) in Higher Education Enterprise Reporting Strategies," presented at CUMREC 1999, printed Feb. 27, 2006 from http://www.educause.edu/ir/library/html/cmr9917/cmr9917.html, 8 pages.
U.S. Appl. No. 10/677,492, filed Oct. 3, 2003; Mohan et al. (related application).
U.S. Appl. No. 12/423,024, filed Apr. 14, 2009, Mohan et al. (related application).
U.S. Appl. No. 11/275,046, filed Dec. 5, 2005; Mohan et al. (related application).
U.S. Appl. No. 11/275,048, filed Dec. 5, 2005; Mohan et al. (related application).

(56) References Cited

OTHER PUBLICATIONS

U.S. Appl. No. 10/087,053, filed Mar. 1, 2002, Office Action dated Aug. 20, 2004—Patented U.S. Patent No. 6,970,881, issued Nov. 29, 2005.
U.S. Appl. No. 10/393,677, filed Mar. 19, 2003, Office Action dated Dec. 7, 2005—Patented U.S. Patent No. 7,194,483, issued Mar. 20, 2007.
U.S. Appl. No. 10/677,492, filed Oct. 3, 2003, Office Action dated May 2, 2006.
U.S. Appl. No. 10/677,492, filed Oct. 3, 2003, Office Action dated Feb. 27, 2007.
U.S. Appl. No. 10/677,492, filed Oct. 3, 2003, Office Action dated Aug. 27, 2007.
U.S. Appl. No. 10/677,492, filed Oct. 3, 2003, Office Action dated Apr. 21, 2008.
U.S. Appl. No. 10/677,492, filed Oct. 3, 2003, Office Action dated Dec. 23, 2008.
U.S. Appl. No. 11/275,046, filed Dec. 5, 2005, Office Action dated Oct. 31, 2007.
U.S. Appl. No. 11/275,046, filed Dec. 5, 2005, Office Action dated Jul. 25, 2008.
U.S. Appl. No. 11/275,046, filed Dec. 5, 2005, Office Action dated Mar. 18, 2009.
U.S. Appl. No. 11/275,048, filed Dec. 5, 2005, Office Action dated Dec. 11, 2007.
U.S. Appl. No. 11/275,048, filed Dec. 5, 2005, Office Action dated Aug. 29, 2008.
U.S. Appl. No. 11/275,048, filed Dec. 5, 2005, Office Action dated Jun. 11, 2009.
U.S. Appl. No. 11/275,050, filed Dec. 5, 2005, Office Action dated Nov. 14, 2007—Patented—U.S. Patent No. 7,536,413, issued May 19, 2009.
U.S. Appl. No. 11/275,050, filed Dec. 5, 2005, Office Action dated Jul. 29, 2008—Patented—U.S. Patent No. 7,536,413, issued May 19, 2009.
U.S. Appl. No. 11/548,456, filed Oct. 11, 2006, Office Action dated Aug. 20, 2008.
U.S. Appl. No. 11/548,456, filed Oct. 11, 2006, Office Action dated Apr. 14, 2009.
U.S. Appl. No. 11/656,017, filed Jan. 22, 2007, Office Action dated Jan. 26, 2009.
U.S. Appl. No. 10/087,053, filed Mar. 1, 2002, Notice of Allowance dated Mar. 28, 2005.
U.S. Appl. No. 10/393,677, filed Mar. 19, 2003, Notice of Allowance dated Dec. 29, 2006.
PCT/US06/39511, filed Oct. 11, 2006, Written Opinion dated Apr. 25, 2007.
Final Office Action for U.S. Appl. No. 11/275,046, mailed on Oct. 13, 2009, 18 pages.
Notice of Allowance, U.S. Appl. No. 10/393,677, filed Mar. 19, 2003, Notice of Allowance dated Dec. 29, 2006.
Notice of Allowance, U.S. Appl. No. 11/275,050, filed Dec. 5, 2005, Notice of Allowance dated Dec. 2, 2008—Patented—U.S. Patent No. 7,536,413, issued May 19, 2009.
Notice of Allowance, U.S. Appl. No. 11/656,017, filed Jan. 22, 2007, Notice of Allowance dated Oct. 5, 2009.
Chinese Office Action, CN 200680045412.0 issued Feb. 5, 2010.
Notice of Allowance, U.S. Appl. No. 11/275,048, filed Dec. 5, 2008, Notice of Allowance dated Apr. 27, 2010.
U.S. Appl. No. 11/275,046, filed Dec. 5, 2005, Office Action dated Apr. 23, 2010.
Notice of Allowance, U.S. Appl. No. 11/548,456, filed Oct. 11, 2006, Notice of Allowance dated Apr. 1, 2010.
International Search Report and Written Opinion, PCT/US10/30801, filed Apr. 13, 2010, ISR/WO dated Jun. 10, 2010.
Fishwick et al., Ontologies for modeling and simulation: issues and approaches, IEEE, vol. 1, Dec. 5-8, 2004, 6 pages.
Cross, Fuzzy semantic distance measures between ontological concepts, IEEE, vol. 2, Jun. 27-30, 2004, pp. 635-640.
U.S. Appl. No. 11/548,456, filed Oct. 11, 2006, Office Action dated Oct. 13, 2009.
U.S. Appl. No. 11/656,017, filed Jan. 22, 2007, Office Action dated Jul. 8, 2009.
U.S. Appl. No. 12/423,024, filed Apr. 14, 2009, Office Action dated Mar. 9, 2011.
U.S. Appl. No. 12/423,024, filed Apr. 14, 2009, Office Action dated Oct. 18, 2011.
Chinese Office Action for Application No. 200680045412.0 issued Jul. 8, 2010.
European Examination Report for Application No. 06816600.8, dated Nov. 15, 2011.
Japanese Office Action for Application No. 2008-535618, mailed Jan. 19, 2012.

\* cited by examiner

| Concepts/Score(%) | Middle East | sports | tamu | pakistan | rehan | siddiqui | karimi | food |
|---|---|---|---|---|---|---|---|---|
| Middle East | - |  | *D* 14.29 | *D* 14.29 | *D* 3.57 |  |  | *D* 7.14 |
| sports | - | - | *D* 3.57 | *D* 3.57 |  |  |  |  |
| tamu | - | - | - | *D* 100.00 78.57 78.57 | *D* 17.86 10.71 | *D* 3.57 | *D* 17.86 | *D* 10.71 |
| pakistan | - | - | - | - | *D* 17.86 | *D* 3.57 | *D* 17.86 | *D* 10.71 |
| rehan | - | - | - | - | - | *D* 3.57 3.57 3.57 |  | *D* 3.57 |
| siddiqui | - | - | - | - | - | - |  |  |
| karimi | - | - | - | - | - | - | - | *D* 3.57 |
| food | - | - | - | - | - | - | - | - |

| | Concepts a and b |
| | Concepts a near b |
| | (b a) |
| | (a b) |

| Concept Cross reference in (%): | ship | Pak | april | Tamu |
|---|---|---|---|---|
| Ship | - | | | |
| Pak | - | - | 97.14 / 97.14 | 97.14 / 97.14 |
| April | - | - | - | 97.14 |
| Tamu | - | - | - | - |

FIG. 5

CONCEPT-BASED METHOD AND SYSTEM FOR DYNAMICALLY ANALYZING RESULTS FROM SEARCH ENGINES

CROSS REFERENCE TO RELATED APPLICATIONS

Priority is claimed under 35 U.S.C. §119(e) and/or 35 U.S.C. §120 to U.S. patent application Ser. No. 10/087,053, entitled CONCEPT-BASED METHOD AND SYSTEM FOR ANALYZING UNSTRUCTURED INFORMATION, filed Mar. 1, 2002, (now U.S. Pat. No. 6,970,881), which is incorporated by reference herein.

Priority is claimed under 35 U.S.C. §119(e) and/or 35 U.S.C. §120 to U.S. patent application Ser. No. 10/393,677, entitled CONCEPT-BASED METHOD AND SYSTEM FOR DYNAMICALLY ANALYZING UNSTRUCTURED INFORMATION AND PROVIDING TRENDS AND EXCEPTIONS TRACKING CAPABILITIES, filed Mar. 19, 2003, (now U.S. Pat. No. 7,194,483), which is incorporated by reference herein.

Priority is claimed under 35 U.S.C. §119(e) and/or 35 U.S.C. §120 to U.S. Provisional Patent Application No. 60/422,237, entitled CONCEPT-BASED METHOD AND SYSTEM FOR DYNAMICALLY ANALYZING RESULTS FROM SEARCH ENGINES, filed Oct. 29, 2002, which is incorporated by reference herein.

Priority is claimed under 35 U.S.C. §119(e) and/or 35 U.S.C. §120 to U.S. Provisional Patent Application No. 60/435,926, entitled CONCEPT-BASED METHOD AND SYSTEM FOR DYNAMICALLY ANALYZING RESULTS FROM SEARCH ENGINES, filed Dec. 19, 2002, which is incorporated by reference herein.

BACKGROUND OF THE INVENTION

1. Field of the Invention

This invention pertains generally to the field of unstructured data analysis and more particularly, to analyzing textual information and dynamically identifying relationships.

2. Discussion of the Related Art

Structured data or objects generally refer to data existing in an organized form, such as a relational database, that can be accessed and analyzed by conventional techniques (i.e., Standard Query Language, or SQL). In contrast, so-called unstructured data or objects refer to objects in a textual format (i.e. faxes, e-mails, documents, voice converted to text) that do not necessarily share a common organization. Unstructured information often remains hidden and un-leveraged by an organization, primarily because it is hard to access the right information at the right time, or to integrate, analyze, and/or compare multiple items of information due to their unstructured nature. Thus, there exists a need for a system and method to provide structure for unstructured information such that the unstructured objects can be accessed with powerful conventional tools (such as, for example, SQL, or other information query and/or analysis tools) and analyzed for hidden trends and patterns across a set of unstructured objects.

Conventional systems and methods for accessing unstructured objects have focused on tactical searches that seek to match keywords. These conventional systems and methods have several shortcomings. For example, assume a tactical search engine accepts search text. For purposes of illustration, suppose information about insects is desired and the user-entered search text is 'bug'. The search engine scans available unstructured objects, including individual objects. In this example, one unstructured object concerns the Volkswagen Bug, one is about insects at night, one is about creepy-crawlies, one is about software bugs, and one is about garden bugs. The tactical search engine performs keyword matching, looking for the search text to appear in at least one of the unstructured objects. In this 'bug' example, only those objects about the Volkswagen bug, software bugs, and garden bugs actually contain the word 'bug' and will be returned. The objects about insects at night, and creepy-crawlies may have been relevant to the search, but could not be identified by the conventional tactical search engine.

One conventional method of addressing this problem allows a user to enter detailed searches utilizing phrases or Boolean logic, but successful detailed tactical searches can be extremely difficult to formulate. The user must be sophisticated enough to express their search criteria in terms of Boolean logic. Furthermore, the user needs to know precisely what he or she is searching for, in the exact language that they expect to find it. Thus, there is a need for a search mechanism to more easily locate documents or other objects of interest, preferably searching with the user's own vocabulary. Further, such a mechanism should preferably enable automatically searching related words and phrases, without knowledge of advanced searching techniques.

In another conventional method, the search is based on meaning, where each of the words or phrases typed is semantically analyzed, as if second guessing the user (for example, use of the term "Juvenile" picks up "teenager"). This increases the result set, and thus makes analysis of search results even more important. Also, this technique can be inadequate and quite inaccurate when the user is looking for a concept like "definition of terrorism" or "definition of knowledge management," where the "meaning" of the phrase is more important than the meaning of the individual words in the search term.

Even when tactical searches succeed in searching or finding information, the problem of analyzing unstructured information still remains. Analyzing unstructured information goes beyond the ability to locate information of interest. Analysis of unstructured information would allow a user to identify trends in unstructured objects as well as to quickly identify the meaning of an unstructured object, without first having to read or review the entire document. Thus, there exists a need to provide a system and methodology for analyzing unstructured information.

Classification systems exist that can organize unstructured objects in a hierarchical manner. However, utilizing these classification systems to locate an object of interest requires knowing what the high-level of interest would be, and following one path of inquiry often precludes looking at other options.

Some conventional technologies store data and information utilizing proprietary methods and/or data structures. This prevents widespread or open access or analysis by keeping objects in a native (non-standard) proprietary format. Thus, there is a need to store captured information about unstructured objects in an open architecture and preferably in a readily accessible standard storage format.

SUMMARY OF THE INVENTION

Accordingly, the present invention is related to a concept-based method and system for dynamically analyzing results from search engines that substantially obviates one or more of the disadvantages of the related art.

In one embodiment, there is provided a method, system and computer program for identifying a relationship between two concepts from an object including (i) selecting the object for inclusion in an initial corpus of objects obtained as an output; (ii) storing the object in a database; (iii) creating an index of the object; (iv) analyzing the index to extract two concepts relating to the object; (v) highlighting the two concepts within object; (vi) calculating a strength of a relationship between the two concepts using a ratio; (vii) storing the two concepts and the strength of the relationships between the two concepts in a database; (viii) presenting the two concepts and the strength as a concept matrix; and (ix) repeating steps vi through viii for every possible pairwise combination of concepts within the index.

The relationship can be, for example, (1) the two concepts both occur in the same object; (2) the two concepts occur near each other within the same object; and/or (3) the two concepts occur near each other and in a particular order within the same object. The ratio can be, for example, (1) a support ratio; (2) an occurrence ratio; or (3) a combined ratio. The two concepts and the strength of the relationships can be stored in a master database. A user can be alerted when the strength of the relationships is within a certain range of the strength of the relationships between two other concepts stored in the master database. An additional concept can be added to the index; all the concepts can be grouped in the index by concept type; and complex meta-structures can be created based upon the concept type.

The concept type can be, for example, (1) a part of speech; (2) a geographic region; (3) a person; (4) a group of persons; (5) a business unit; (6) an organization; (7) an action; (8) a process; (9) a product; (10) a service; (11) a subject; and (12) a category. A percentage threshold for the one or more ratios can be set. The previous steps can be repeated as long as the ratio exceeds the percentage threshold.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED DRAWINGS

FIG. 5 shows four exemplary concepts in an observed relationship matrix.

DETAILED DESCRIPTION OF EMBODIMENTS OF THE INVENTION

Figure 1:
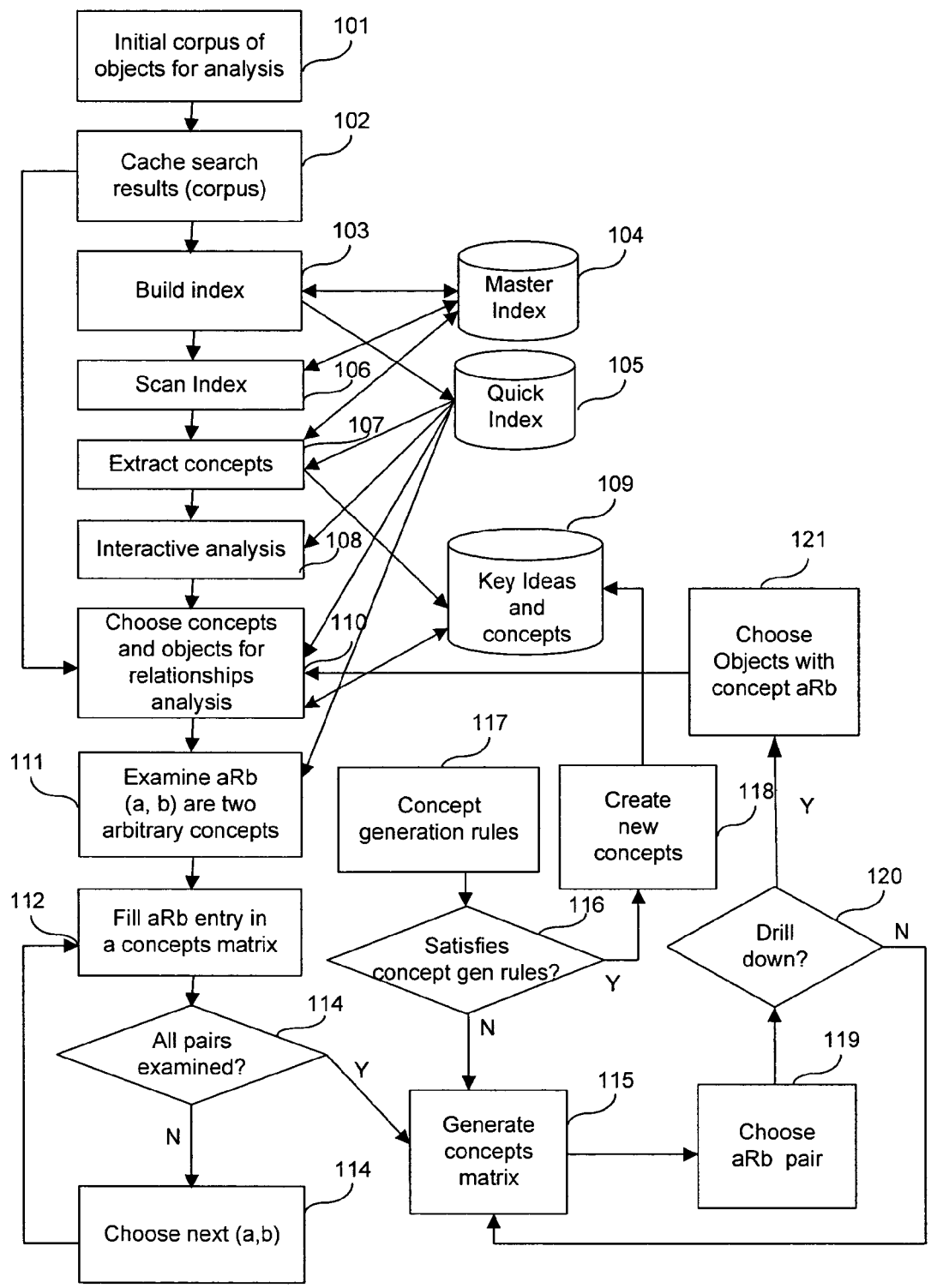
FIG. 1 shows an embodiment of an analytical process for identifying relationships in a set of objects or corpus.

Reference will now be made in detail to the preferred embodiments of the present invention, examples of which are illustrated in the accompanying drawings.

Some of the terms used in this application are defined below:

Object: An electronic file containing unstructured, semi-structured, and/or structured data. Exemplary objects include word-processing documents, emails, text files, web pages, spreadsheets, or database entries.

Unstructured data: A collection of free-form textual information within an object that may or may not be formatted. Unstructured data can be located in any object.

Corpus: A collection or set of objects (usually a subset of a "universe" of objects).

Concept: a word or a phrase composed of several words, or a similar semantic construct.

This invention is related to systems, algorithms, methods, computer programs and computer program products as well as other ways to dynamically analyze, identify and present relationships in a collection of textual data. Embodiments of the invention use compact and tailor-made indices for building concept and relationship matrices that dynamically address some limitations of conventional indexing techniques.

While there is a need to identify relationships, patterns and exceptions embedded in large volumes of textual data, there is also a need to identify patterns and relationships in smaller subsets of data, such as search engine results. This invention proposes methods to identify any type of relationship automatically in a given corpus and to visualize relationships amongst textual information.

The system and method of the present invention can identify trends and exceptions irrespective of where they occur, as well as assist a user with the same. They can be spotted through the analysis and exception process, as described in co-pending above-referenced U.S. patent application Ser. No. 10/087,053 and U.S. patent application Ser. No. 10/393,677, which are incorporated by reference herein. The process of identifying relationships among and between extracted concepts is explained below. This process can be used separately, in conjunction with the dynamic analysis of search results, or as part of analyzing any collection of textual data. This collection of textual data includes, but is not limited to e-mails, documents, web links, textual columns, and the like.

The process of relationship discovery includes the optional step of concept extraction. Extraction is used to categorize, search, and deduce the theme, or meaning, of unstructured information. A number of extraction mechanisms are possible, and it will be appreciated that the extraction mechanism described below with reference to FIGS. 9-14 is only one of a number of options.

An analysis and categorization engine 900 accesses unstructured objects 910, including individual unstructured objects 912, 914, 916, 918 and 922. The analysis and categorization engine 900 which has been developed by Intelligenxia Inc., of 4905 Belfort Rd., Suite 110, Jacksonville, Fla. and is described in above-referenced U.S. patent application Ser. No. 10/087,053, and U.S. patent application Ser. No. 10/393,677.

The analysis and categorization engine 900 also accepts user-specific input 950 and can include search text. Based on the unstructured objects 910, the user input 950, and the search text, the analysis and categorization engine 900 generates structured information 930. An object concept-based search engine 940 can be used. The search engine 940 accepts search text 920 and utilizes the structured information 930 generated by the analysis and categorization engine 900 to return unstructured objects 960 having a concept match. This approach includes a search capability, but returns objects with a concept (not keyword) match and returns relevant unstructured objects 960 having a conceptual match to the search text even if the text of the returned object does not contain any of the search words.

The analysis and categorization engine 900 operates to generate or otherwise determine structured information from or about unstructured objects 910. The analysis and categorization engine 900 generates, determines, or builds categories and assigns unstructured objects 910 to categories. A 'category' denotes a set of words or phrases that become related to one another when they are grouped (or otherwise identified) as forming or belonging to a category.

User input 1000 and/or training objects 1010 are utilized by the analysis and categorization engine 900 to build categories (1020). The analysis and categorization engine 900 uses the built categories operation (1020) to capture concepts (1030). With further user input 1000 and a dictionary or thesaurus look-up 1040, the analysis and categorization engine 900 generates concept groupings. A captured 'concept grouping' (see 1330 in FIG. 13) denotes a group of concepts related in one or more predefined ways—such as synonyms or meaning words and phrases discovered in a dictionary look-up or setup by the user using a concept customization interface. Each captured concept grouping 1035 is headed, or named, by one concept—"a seed concept."

The analysis and categorization engine 900 accepts an unstructured object (1070) as input, filters the object (1080) and utilizes the concept groupings (1035) to index the object (1090). Indexing, as generally known in information retrieval, refers to representing an object as a function of the parameters that will be utilized to search, analyze, or retrieve the object. The indexing generates a vector representation of the object, having a number of dimensions where each dimension has a weight. Each dimension corresponds to a seed concept, and the weight given to each seed concept depends in part on the frequency of occurrence of that concept within the object.

The index is utilized by the analysis and categorization engine 900 to generate a Gaussian distribution of weights (1091) for each object and select a set of concepts to represent each object (1092), here referred to as "key concepts". The objects are scored (1093) and assigned to categories (1094). The analysis and categorization engine 900 stores the information it extracts in a structured open architecture format for use by available structured analysis tools and the user interface.

Throughout the steps taken by the analysis and categorization engine 900, output or information generated or determined by the analysis and categorization engine 900 is stored as structured information in an open architecture format.

One or more unstructured objects are input (1070) and optionally filtered (1080), to first remove undesired information and/or to extract only other predetermined information. The filtering 1080 involves removing one or more of formatting characters, special characters and encoding of information. Other or different characters or information may also be removed when present. The output of the filtering process is a filtered object—preferably extracted text along with properties of the unstructured object, such as created date, size, title, description, and modified date. Filters are widely available and known in the art for most object formats.

Figure 11:
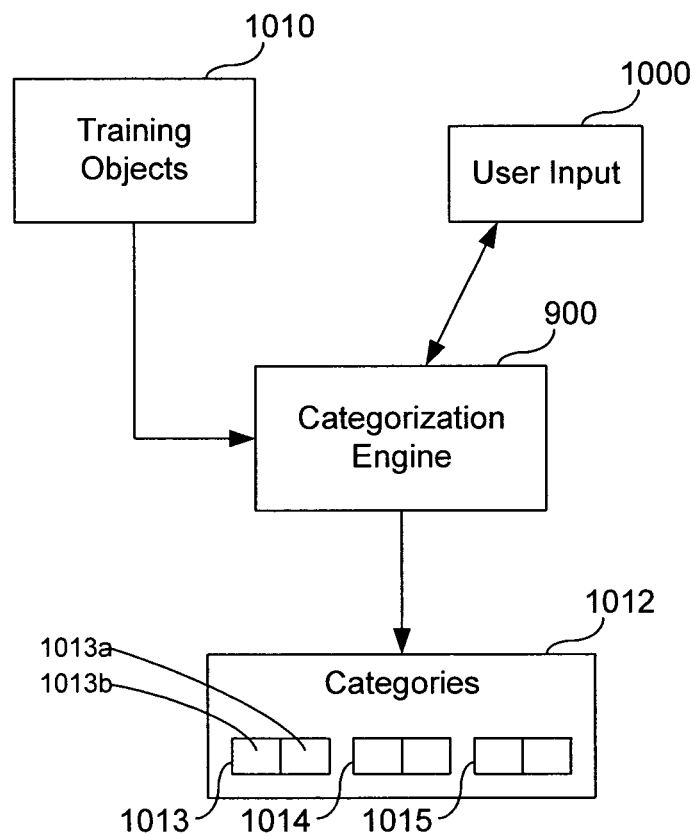
Figure 12:
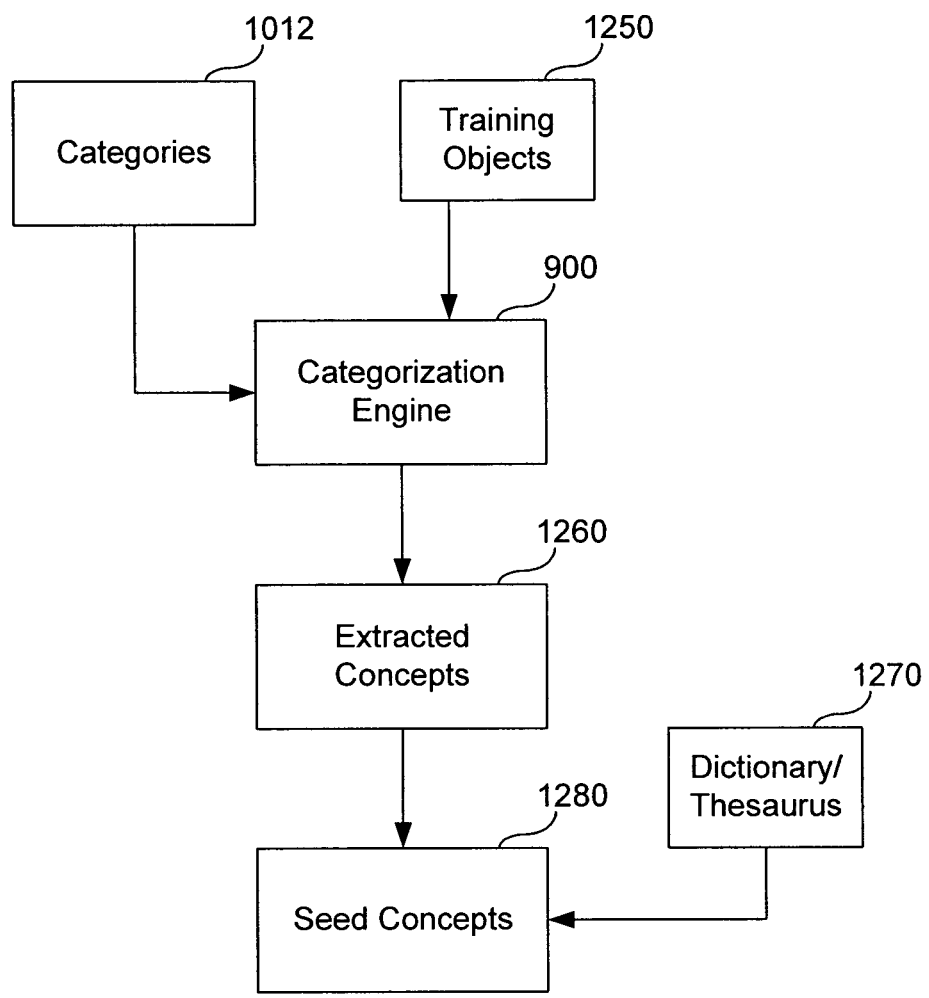

As shown in FIG. 11, categories 1012, including individual categories 1013, 1014, 1015, are built by the analysis and categorization engine 900 after scanning a set of training objects 1010, or in concert with user input 1000, or by a combination of these two approaches. One exemplary structure for forming the category 1012 is to provide or otherwise generate a category name 1013a and a category description 1013b that together define the category 1013. A description is a set of words that are in some way related to the category name and that further define the category. Categories may be specific to a user, or groups of users, and may be built through user input or by automatically training the analysis and categorization engine 900 on a set of objects, or through a combination of these two techniques. The category 1012 may simply consist of a list of words or phrases, it need not have a 'name' or 'description' as utilized in the example.

The generated category name will be a subset of category description. In an example embodiment the top $N_k$ (e.g., five) highest key concepts are selected from the category description as the category name. The user, through an interface, can edit and change the generated category name and the selection of concepts for the name and description. Creating a category name is based on a number of objects for object name and description creation. Generally, the greater the number of objects in the training set, the better the generated concept name and description. The user can group a set of objects and instruct the analysis and classification engine to create category description and category name.

Once the categories 1012 have been established (note that they may be modified or updated as desired to reflect further intelligence, knowledge, understanding, or data), the analysis and categorization engine 900 captures a set of concepts. The concepts are preferably given a global concept ID number. This number is generated generally by the database engine and is stored as a unique identifier. Global concept ID numbers and concept text, along with an optional (but preferably included) date/time indicator, such as a timestamp, are stored in a concept relational database. These dates and times assist in assessing relevance and currency of the information which may change over time.

A seed concept 1280 is a concept that serves as a basis for a concept grouping and is a sub-type of concept. It is either generated when words get extracted or when the user provides category name and description. Thus the seed concept ID is assigned from the same pool of concept identifiers. Three examples of capturing or generating seed concepts are given below.

In one embodiment, the analysis and categorization engine 900 accepts a set of training objects 1250 that define a category. The engine 900 extracts seed concepts 1280, based on a category descriptions 1013-1015. In this case, the category description 1013-1015 are parsed to get individual words by removing the stop and noise words. The resulting set of words become seed concepts 1280.

In another embodiment, the analysis and categorization engine 900 scans all available documents (such as those stored in a defined directory or a list) and extracts a list of the most frequent keywords and their related words. The analysis and categorization engine 900 utilizes categories and training objects to extract a list of concepts.

Seed concepts 1280 are refined by a dictionary and thesaurus look-up 1270. The thesaurus can be augmented by use of additional thesaurus as well. For example, in addition to the English thesaurus, for the legal industry a legal thesaurus will be first accessed for the look-up (for example). This word extraction or generation procedure may, for example, utilize semantic analysis rules or policies and take into account word or phrase occurrence frequency, synonymy, and/or polysemy, grammatical part of speech as well as other optional attributes and/or rules. In some instances, the rules may vary depending upon the number and size of documents or other information items available. An electronic dictionary and thesaurus 1270 in the form of a database stored in a memory or storage device can be used to generate additional words and/or phrases. Based on the set of extracted words, the seed concepts 1280 are generated.

Extraction can use a variation of Latent Semantic Indexing, a well known information retrieval technique. The idea is to extract best possible words out of every document and build a superset of words or phrases and their relationships that would then be able to describe the object collection. The first step in this process is extracting most frequently occurring words from every document. Documents can be sampled in arithmetic or geometric progression and the sampling selection can be based on several criteria, such as time, size, author etc. The type and frequency of sampling can be modified by the user. The number of words to be extracted from a document is limited by a constant that can be set by the user. Also, in order for smaller documents to contribute at the same proportion as the bigger documents, the word extraction process has to be normalized. The process for extracting words from an individual object is as follows.

A typical assumption is that every kilobyte of text has approximately W words. The number of words ($n_w$) that can be extracted from a document is given by the formula $n_w = D_s/W$, where $D_s$ is the document size. The user can control the upper limit of $n_w$. In this first step, the system will extract up to $n_w*10$ frequently occurring words from the document. In the next step, for every word extracted, the word's part of speech will be determined based on grammar look-up. A proper noun will be given the highest weight $W(word_i)$, a verb will be given lowest weight and a polysemy word will be given medium weight. The overall weight by word for every selected word is $W(word_i)*f(word_i)$ where $f(word_i)$ is the number of occurrences of the $word_i$. Now, $n_w$ can be chosen in the descending order of $W(word_i)*f(word_i)$. If we call word collection $n_w$ from object $O_1$ as $n_{wo1}$ then the superset, $\{n_{wo1}, n_{wo2}, \ldots n_{wom}\}$ becomes a collection of seed concepts for m objects where $\{O_1 \ldots O_m\}$ is a collection of individual objects.

In yet another embodiment, a list of words and phrases is generated from a user provided description for a category. This is a preferred way of generating seed concepts, as user-specific information is directly input to the system. The user can input one or more phrases each within double quotes and the engine will capture and store each of them as a multi-word concept. Multi-word concepts are given as much part-of-speech weight as a proper noun.

Figure 13:
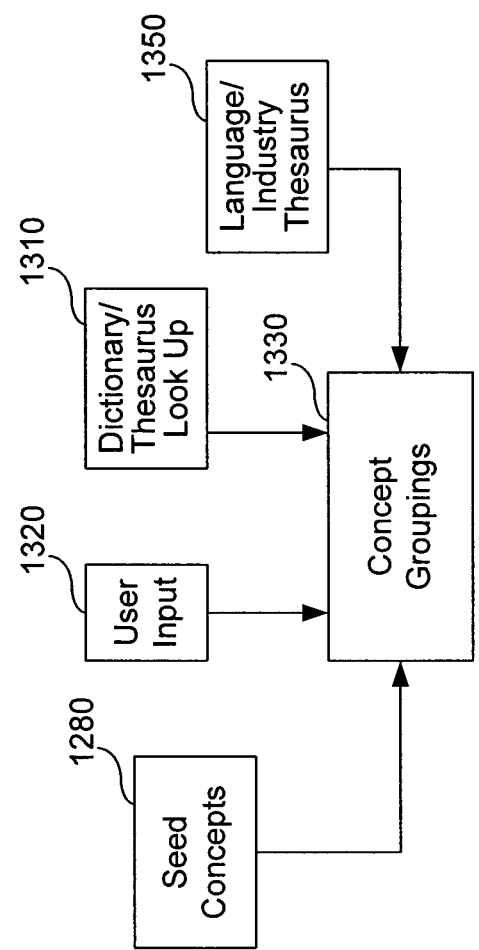
Figure 14:
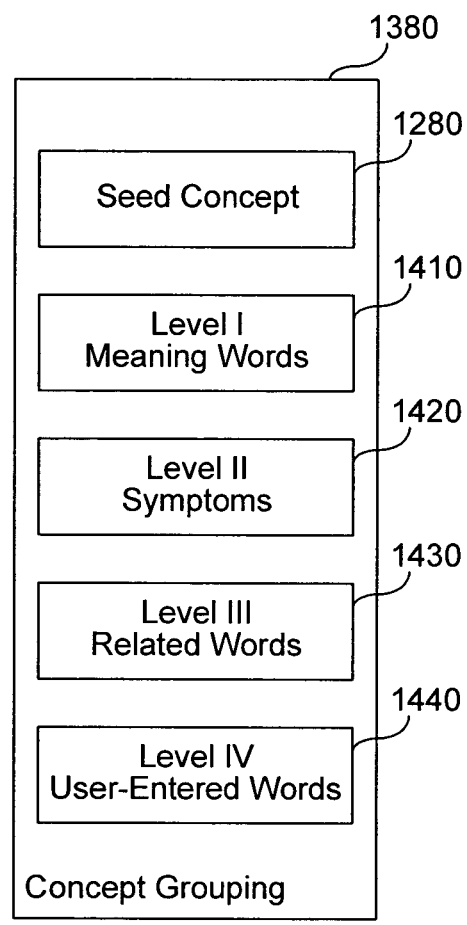

Once seed concepts 1280 have been generated (see FIG. 12), they are extrapolated into concept groupings 1330 using a seed concept extrapolation procedure (see FIG. 13). The procedure preferably uses a combination of seed concepts 1280, user input 1320, dictionary/thesaurus look up 1310 and industry specific thesaurus 1350. Seed concepts 1280 are augmented utilizing one or both of a dictionary/thesaurus look-up 1270 and user-entered words (user input) 1320 to form the concept groupings 1330 that are a set of related concepts. The concepts in the concept groupings 1330 are related in predetermined, structured ways and are stored together, for example, in a relational database table that demonstrates their relatedness. The analysis and categorization engine 900 preferably extracts not only words from the dictionary or thesaurus, but the relationship between the words and the seed concept and optionally but preferably the part of speech as well.

An exemplary embodiment of a concept grouping (see FIG. 14) employs four levels, where each level denotes a conceptual manner by which the concepts are related—meaning words 1410, synonyms 1420, related words 1430, and user-entered words 1440, although more than (or fewer than) four levels could be used. The seed concept is 'young', and meaning words (Level I) (1410) determined through a dictionary look-up (or reference to some other meaning sources) include 'youthful', 'new', and 'offspring'. Synonyms (Level II) (1420) determined through a thesaurus lookup (or some other source), include 'adolescence', 'immature', and 'childish'. Related words (Level III) (1430) determined in a thesaurus lookup or reference to other sources include 'youth.' Finally, the user has entered the phrase '18 to 24 years old' as a user-entered word or phrase (Level IV) (1440). By incorporating user-entered words and phrases into the concept groupings, the analysis and categorization engine 900 preferably goes beyond thesaurus and dictionary terms to capture meaning specific to a user or an industry. For example, the term 'delinquent' may refer to unlawful activity in typical English language usage while it refers to overdue accounts in the consumer credit industry. The concept groupings allow this specialized meaning to be captured. The user can deactivate any of the words or phrases included in the concept grouping, as well as elect not to use any of the available levels.

Concept groupings 1330 can be stored in a seed relationship relational database table. Since concept groupings 1330 are generally user-specific, the user ID is stored along with a global seed concept ID, a related concept ID, and the type of relationship. A status flag or indicator also may be stored, allowing the user to activate or deactivate specific relationships.

It should be noted that the seed concepts 1280 themselves can be interrelated. For example, the two seed concepts "bug" and "insect" have the same meaning. The engine 900 scans the database looking for relationships among individual seed concepts. This is done by taking an individual seed concept 1280 and looking for the existence of related concepts. The relationship is established again using thesaurus look-up 1270. For example, in this case, bug has the same meaning as insect and, when insect appears in the table of concepts, a concept grouping entry will be created by linking "bug" at Level I with "insect." Thus, concepts having similar meanings, synonyms, inflections and related words would be linked.

The analysis and categorization engine 900 scans an unstructured object 910 and extracts concepts (1260, see FIG. 12) and the number of occurrences, or hits, of each concept within the object. The engine 900 neglects or ignores stop and noise words. The words such as "a", "the", and "and" are examples of common noise words that are ignored in search strategies. Stop words are words that need not be processed and are not important for the user or the view. The user has the flexibility to set any word to be a stopword and allow the engine 900 to skip processing such words.

The analysis and categorization engine 900 preferably determines if each extracted concept 1260 is in the known concept groupings 1330 and generates a vector representation of the object 900 where each dimension corresponds to a seed concept. The known concept groupings 1330 may be different for different users or groups for the same unstructured object 910. Preferably but optionally, the analysis and categorization engine 900 assigns a weight to each vector dimension so that more important concepts may be given greater consideration. For example, weight may be assigned based on the frequency of occurrence of that concept in the object.

The total number of occurrences of an extracted concept 1260 within an object 910 or some measure or metric derived from such total is stored in a cross-reference relational database table. This table preferably includes the global object ID (as indexing is desirably independent of user), the concept ID, number of hits, and location of the concept within the object. Additionally, an index start time and cross-reference time are included to keep a block of cross-references for an object together and to enable later search capabilities. Preferably, a cross-reference entry is made for each concept.

In addition, the system looks beyond synonyms, related words, and definition words by using the concept groupings that have already been built and which are described in greater detail elsewhere in this description. The concept groupings preferably have four levels, as described above, spanning synonyms (Level I) (1410), related words (Level II) (1420), meaning words (Level III) (1430), and user specific input (Level IV) (1440) that are utilized to reduce the dimensionality of the vector representation.

Specific information extracted by the analysis and categorization engine 900 could be stored at different stages in relational database tables having a slightly different organization. Further, other data storing mechanisms could be utilized for making available the output of the analysis and categorization engine 900 analysis.

There also exists a need for analyzing extracted concepts for relationships and patterns. While there is value to extracting concepts indicative of the corpus of documents, there is greater value if the user were given an opportunity to understand how any of these extracted concepts relate to each other. An example would be if the user were provided with an ability to pick up the relationship between Atta and Osama (two international terrorists) in the intelligence research or between cholesteatoma and atelectasis (two ear related diseases) in healthcare research.

Analysis for embedded relationships and patterns provides the ability to mine the extracted concepts 1260 for relationships. A corpus with a given set of concepts can be analyzed for possible relationships and patterns. The idea is to discover anomalies and patterns hidden (or not readily apparent) in data that are worth further examination. This can be performed on any corpus and can include but not be limited to the results of a search engine or contents of a folder, or the like. Taxonomy builders that receive a corpus as input and generate hierarchical ordering of concepts as output, could organize data based on user input, or automatically, using some predetermined rules or policies, or using some dynamic procedure or a combination of predetermined and dynamic rules and policies. In either case, taxonomies are built to organize data rather than discover anomalies. Thus a different analytical approach is necessary.

The process of analyzing relationships amongst concepts is based on mathematical theorems and their corollaries of relations (termed "R"). Thus, before discussing the flow chart and process flow for identifying relationships among concepts, an understanding of properties of relations among concepts is necessary. Relationships have the following properties:

Let "a" be a concept with child concepts $ac_i$, where i=1 through n, and n=number of child concepts that define the concept a. Similarly, "b" is a concept with child concepts $bc_i$, where i=1 thru n, and n=number of child concepts. Example: Afghanistan is a concept with Kabul, Kandahar and Mazar-I-Sharif as child concepts. (For a complete discussion on embodiments and notions of concepts, their levels, and other properties and features, refer to above-referenced co-pending U.S. patent application Ser. No. 10/087,053 and U.S. patent application Ser. No. 10/393,677, which are incorporated by reference herein in their entirety).

"aRb" is then defined as a relation b where "a" and "b" are concepts, and "R" is any relation that may exist, or be defined to exist, or is queried to exist between a and b. The relation R can be any relationship between two concepts. In this case, R may include, but is not limited to: {and, or, proximity/near}. The notion of proximity or nearness/farness in this context includes appearing in the same document, appearing within some number of words, symbols, letters, sentences, paragraphs, pages, or any other distance relationship. Furthermore, proximity, "and", "or", "not", or other logical or Boolean expression may be combined as the relation. For aRb, the following properties hold true:

i. aRa is always true. This means the relation is reflective.

ii. aRb does not imply bRa. This means the relation is not necessarily symmetric. Continuing the terrorist example from above: The concept "Osama" occurring before concept "bin Laden" is not the same as "bin Laden" occurring before "Osama".

iii. aRb and bRc does not imply aRc. This means the relation is not transitive. For example "Osama" can occur immediately before "bin", and "bin" can occur immediately before "Laden". However, "Osama" need not occur immediately before "Laden".

iv. aRbRc=(aRb)Rc=aR(bRc). Here, the grouping or sub-groupings of relations are equivalent. For example "Osama" is related to "bin" is related to "Laden". If the prior statement is true, then "Osama bin" is related to "Laden" and "Osama" is related to "bin Laden".

Once the relationship between two concepts a and b has been identified, it facilitates creation of a new concept c=aRb. For example, consider the concept a="Osama Bin Laden" and concept b="Terrorism." Let the relation R be "and." We need to see if ((Osama bin Laden) and (Terrorism)) occur as a strong relationship in the corpus of objects. If in the corpus of documents, it turns out that ((Osama bin Laden) and (Terrorism)) occur together, then a concept c=((Osama bin Laden) and (Terrorism)) can be created. This will become a concept that can be analyzed with other concepts for possible relationships.

The strength of the relationship between two concepts can be measured by a numerical metric. For example, the following ratios can be used:

a. The ratio between the number of objects ($n_R$) that have the relationship aRb occurring at-least once and the total number of objects (n). Let this be $n_R/n$. As the ratio increases, the occurrence of the relationship aRb among the objects increases. In data analysis terminology, this is also called the "support ratio."

b. Let o(x) be the number of times (occurrence) that a concept x occurs in the targeted object(s). Then o(aRb) is defined as the occurrence of aRb, o(a) is the occurrence of concept a, and o(b) is the occurrence of concept b. Then $o(aRb)/[o(a)+o(b)]$ defines the ratio of how many times a relationship occurs in the corpus of objects. This term is called the "occurrence ratio" and is relevant for text analysis. This is because (unlike data transaction records where a concept can occur only once in a record, e.g., as a coded column or field), the same concept can occur multiple times in a given object. For example, the concepts "Osama bin Laden" and "terrorism" can occur multiple times in the same document. Thus, a ratio to take this factor into account is needed. Note that this ratio is independent of number of objects (n) in the corpus. As this ratio increases, the strength of the observed relationship in the corpus increases.

The "combined ratio" $S_R=(n_R/n)*(o(aRb)/[o(a)+o(b)])$ represents the overall strength of the relationship in the corpus.

If there are $a_1, a_2 \ldots a_n$ concepts, then in order to identify relationships among different groupings, there are $n+nC2+nC3+ \ldots +nC(n-1)$ combinations. C is the combination operator, nCk is also read as "n choose k", and $nCk=(n!/[k!*(n-k)!])$, where ! is the factorial operator $[n!=n*(n-1)*(n-2)* \ldots *2*1]$. These $n+nC2+nC3+ \ldots +nC(n-1)$ combinations would be:

$a_1, a_2, \ldots a_n$ as the base concepts;

$(a_1Ra_2), (a_1Ra_3), \ldots (a_1Ra_n), (a_2Ra_3), \ldots$ are concepts taken two at a time; and $(a_1Ra_2Ra_3), (a_1Ra_3Ra_4) \ldots$ are concepts taken three at a time and so on.

Relationships that exist among concepts within the set of objects (the corpus) are identified as set forth below:

In order to identify relationship among concepts $a_1$ through $a_n$, where n=number of concepts, it is sufficient to identify relationships between two concepts at a time, i.e., pair-wise manner. Such pair-wise relationships can then be extended to other pairs.

Proof of the sufficiency of pair-wise identification to any number n of concepts can be derived by induction:

i. Concept $a_i$ is related to itself. $a_iRa_i$ is true by reflective property.

ii. By symmetric property $a_iRa_j \neq a_jRa_i$ where $i,j=1 \ldots n$ and $i \neq j$ iii. Let $a_i$ and $a_j$ be two arbitrary concepts. Then, $a_1Ra_2Ra_3R \ldots a_i$ can be written as $(a_1Ra_2)Ra_3R \, a_i$. If, $a_1Ra_2=b_1$. Then the relationship becomes $b_1Ra_3R \ldots a_i$. This can be written as $(b_iRa_3)R \, a_i$. This becomes $b_3R \ldots Ra_i$. By applying this successive reduction, the relationship will finally be $b_{(i-1)}Ra_i$.

Thus, it is possible to show relationship among concepts taken two at a time, and then extend this process to show relationship among concepts with any combination greater than two. Note that there is no theoretical limitation on what the relation R can be, per pair of concepts. R can be {and, near, (a b), (b a)}, where a and b are two arbitrary concepts.

An embodiment of an analytical process for extracting relationships from a corpus will be described with reference to FIG. 1. In this embodiment of the process for extracting relationships the following steps are performed to generate a matrix of observed relationships from the corpus.

In step 101, a set of objects is selected (for example, search results from a search engine output), which become the "universe" of objects. The set of objects can be stored on a server within a LAN, becoming the "corpus" of objects (step 102). This is needed for subsequent indexing and hits highlighting and is useful for reducing network traffic. The contents of the set of objects can optionally be stored on a client machine. This is useful for reducing traffic between the client and the LAN server. An index is then created (step 103), which may be a master index 104, or a quick index 105. The index generally identifies location of contents within the object (or objects), in other words, for example, in a text document, the location of words in the document. Metadata can also be included in the index. As opposed to adding this data to a master index for subsequent analysis, another option includes dynamically building a smaller quick index that includes only the set of objects from step 102. A quick index is an index of the contents of a selected subset of objects, rather than an index of the entire corpus. This helps in the following ways:

i. It cuts short dramatically the time it takes to analyze the index.

ii. It focuses the analysis to just the corpus resulting from step 102. This way, any trends, exceptions and patterns discovered are attributed to the search results corpus.

Figure 2:
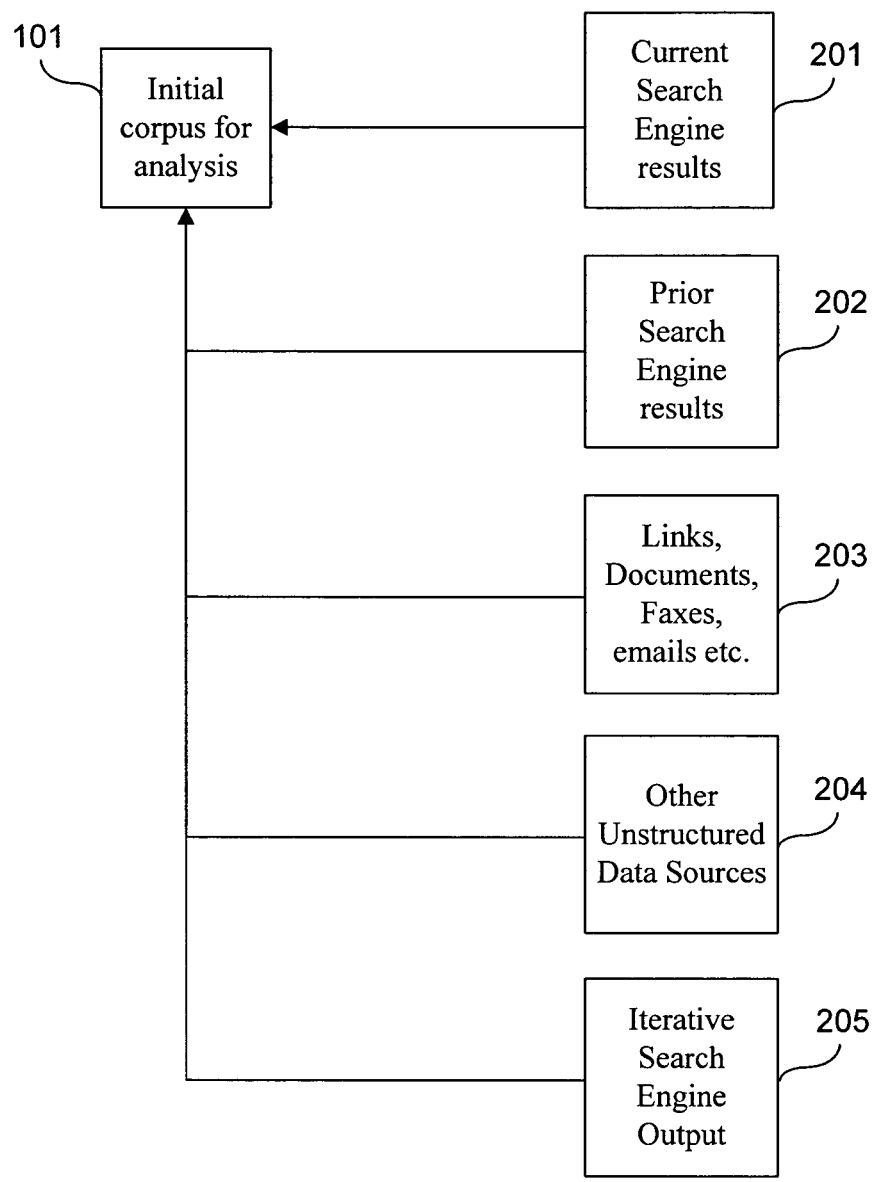
FIG. 2 shows an embodiment of multiple methods for selecting the initial corpus or set of objects.

The index is scanned (step 106), and the contents are analyzed looking for any embedded concepts. In step 107, concepts are extracted, as described further below. Key ideas and concepts may be stored in a database 109 which might contain extracted or manually added or refined concepts An interactive analysis can be conducted with user input (step 108). A set of objects can be selected (step 110), with input from the quick index 105 and Key ideas and concepts 109. The set of objects can be selected in various ways, such as:

a. Output of search results (see FIG. 2, block 201).

b. A subset of objects (the corpus) from prior search engine output (FIG. 2, block 202) (for example when performing drill-down within a set of objects.)

c. A subset of objects (forming the corpus) selected from several sources (FIG. 2, block 203) such as (not limited to) links, documents, or faxes, or in other ways, or selected from other sources based on the metadata contained within the objects.

d. Selecting the initial set of objects in any other way when the data sources are unstructured (FIG. 2, block 204).

e. Search engine output from additional searches (FIG. 2, block 205).

Key concepts and ideas embedded in the document are extracted (step 107). Concepts can be extracted using either the Master Index 104 or Quick Index 105. A key concept is a concept that is representative of the "meaning" or "idea" of the object. For example, a key concept in an article about Osama bin Laden may be "terrorism", even if the word "terrorism" is not mentioned in the article itself. The key concepts may be presented in the form of a list of concepts with appropriate weights. These can be presented as (1) a suggested concepts list and (2) a concepts matrix. The suggested concepts list is a list of suggested concepts that can be sorted in multiple ways. Some of the ways are:

Alphabetical: Concepts are presented in ascending or descending alphabetical order.

Hits (occurrence): Concepts are presented in ascending or descending order of hits, their frequency of occurrence (how many times the word or phrase or other words/phrases or symbols or sets of symbols that are the parent word/phrase's children) occur in the corpus.

Document Count: Concepts are presented in ascending or descending order by the number of objects contained within the corpus in which they occur.

Concept rarity: Concepts are presented in ascending or descending order of score calculated using a concepts extraction algorithm. As the score is more dependent on how strong a concept occurs as a participating theme in a document, the sorted order by score reveals concepts that may not occur most frequently but appear as themes of selected group of documents.

Data is analyzed by selecting concepts to be analyzed (see interactive analysis step 108). The selected concepts will be viewed for example, in a matrix format where the concepts occur as columns (y) and the documents as rows (x). The coordinate (x, y) will be occurrence or the number of hits of the concept (x) in the document (y).

Relationships amongst concepts taken two at a time are identified as follows:

a. Build and use quick index as discussed with reference to step 102 above.

b. For the selected concepts, build a matrix for capturing relationships (step 111) with the same set of concepts occurring in both rows and columns. Each cell will have four entries as follows (it will be appreciated that these entries, and their number is exemplary only, and other types of entries can be developed):

c. Let a and b be two arbitrary concepts. Then:

d. Generate or compute Entry 1: is (a and b) occurring in the corpus of documents. This is ((number of objects with (a and b))/(total number of objects))*((number of times (a and b) occurs in the corpus)/((number of times a occurs in the corpus)+(number of times b occurs in the corpus)).

e. Generate or compute Entry 2 is (a near b). Nearness is measured by distance between the rightmost word of concept a and leftmost word of concept b. The distance for analysis can be set or modified by the user as well. This is ((number of objects with (a near b))/(total number of objects))*((number of times (a near b) occurs in the corpus)/((number of times a occurs in the corpus)+(number of times b occurs in the corpus)).

f. Generate or compute Entry 3 is (b a) where "b a" occurs as a phrase. This is ((number of objects with (b a))/(total number of objects))*((number of times (b a) occurs in the corpus)/((number of times a occurs in the corpus)+(number of times b occurs in the corpus)).

g. Generate or compute Entry 4 is (a b) where "a b" occurs as a phrase. This is ((number of objects with (a b))/(total number of objects))* ((number of times (a b) occurs in the corpus)/((number of times a occurs in the corpus)+(number of times b occurs in the corpus)).

Perform steps 112-114 nC2 times by choosing different combinations of concepts a, b to generate a relationship matrix (step 115)

Figure 3:
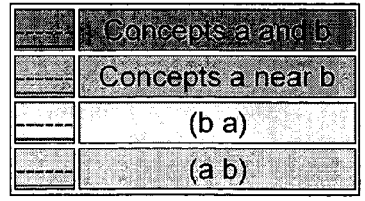
FIG. 3 shows an example of a resulting observed relationship matrix using the analytical process described in FIG. 1.

The resulting observed relationship matrix (see step 115) for example concepts {ship, pak, april, Tamu, Pakistan, Texas, email, HIV} is shown in FIG. 3. The relationships matrix represents the cross reference of concepts chosen for analysis and the strength of the relationship amongst them. The relationship strength is a ratio that is represented here as a percentage. Every entry in the matrix has been evaluated for R={and, near, (a b) and (b a)}, where a, b are two arbitrary concepts. Thus, there are four possible percentages. The cross-reference percentage for the first entry: a and b will be always greater than or equal to the cross-reference percentage for the second entry: a near b. Also, the cross-reference percentage for a near b is always greater than or equal to the cross-reference percentage for (a b) ($3^{rd}$ entry) or (b a) ($4^{th}$ entry). Note that the relationship matrix is upper triangular because of properties of relations (the only relation that is not symmetric ('(a b)' and '(b a)') is represented as $3^{rd}$ and $4^{th}$ entries of every intersection of the upper triangular matrix.

Figure 4:
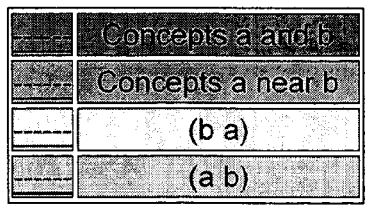
FIG. 4 shows an example of a nested observed relationship matrix considering a specific context of two concepts with respect to a specific relationship between these concepts.

Some observations about the concept relationships based on the performed analysis should be noted:

a. Concepts "Rehan" and "Siddiqui" occur only in 3.57% of all the objects. But wherever they occur, they occur near each other (in FIG. 3 analysis, the distance was set to two words). Also Rehan occurs just before Siddiqui all the times. It is very likely that Rehan Siddiqui is a single name possibly of a person.

b. Concepts "Pakistan" and "Tamu" in FIG. 3 occur in the same document 100% of the time, but 78.57% of the time they occur near each other (the distance was set to two words) and every time they occur near each other, they occur as (Pakistan Tamu).

c. Drilling down, as illustrated in FIG. 4, on the intersection of concepts "Rehan" and "Siddiqui", in the objects that have both "Rehan" and "Siddiqui", they occur as Rehan Siddiqui 100% of the time.

In FIG. 1, in step 116, the relationship matrix is tested against a set of concept generation rules 117. If the rules are satisfied, new concepts can be created (step 118).

Optionally, depending on evaluating the ratio, the user can choose the relationships of interest and create a new concept c=aRb (FIG. 1, step 118) where R in this case is {and, near, (b a), (a b)}. The newly created concept will be added to the existing set of concepts. This concept can also be added to the set of concepts being analyzed. This way, concepts can be built based on other concepts and so on. Optionally, this matrix can be iteratively built for existing concepts and newly created concepts in the previous step.

By setting percentage thresholds and rules, optionally, concepts can be automatically built, as defined in FIG. 1, step 117.

Optionally, it is also possible to further drill down in this corpus by any concept intersection. For example, two arbitrary concepts $a_i$ and $a_j$ can be chosen, see FIG. 1, step 119.

If an identified set of objects {$o_1 \ldots o_n$} already exists, a subset of objects can be selected from this set. This subset will have all the objects that have {$a_i Ra_j$} R is the relation between concepts $a_i$ and $a_j$. (FIG. 1, step 121).

Once the subset of objects has been identified, a relationship analysis can be performed again, starting with step 110 in FIG. 1, as described above.

The above iterative analysis can be generalized to multi-planar analyses of nested strength of relationship ($S_R$), as illustrated in the 4×4 concept table in FIG. 5.

Let the concept notations C1, C2, C3 and C4 represent ship, Pak, april, and Tamu, respectively. In general, there can be any number of concepts that can be considered C1, C2, C3, C4, ... Ci, Cj, Ck, ... Cm. A two-dimensional planar view is illustrated in FIG. 5. In this example, four types of relationships were stated. In general, there can be many types of relationships between and/or among concepts not described in this document. Including but not limited to compound joinder between concepts such as (C1 AND C2) or (C3 AND NOT C4). Relationship types will be indicated by Roman numerals I, II, III and IV only for illustrative purposes in that there may be many more relationships defined. The $S_R$ is indicated for each relationship defined between and/or among the nested concepts (see FIG. 6 and FIG. 1 step 110).

Concepts can be grouped by various levels of importance. For example "PAK" can be grouped as a "Country" or as "Region" or as a "Noun". "Tamu" can be grouped as a "University". A concept such as "Hiding" can be grouped as "Action", "Verb" etc. These groupings can be custom defined or can be derived by doing a look-up in a dictionary, thesaurus, or the like.

Next, a relationship discovery algorithm can be run, by selecting a group of countries and discovering embedded relationships, for example, against a group of "Actions". This is very powerful and can help construct complex meta-structures such as "Country-Action-Country", "Noun-Verb-Noun", etc. A meta-structure therefore is a pattern of concept types, and relationship discovery allows meta-structures to be identified.

Figure 6:
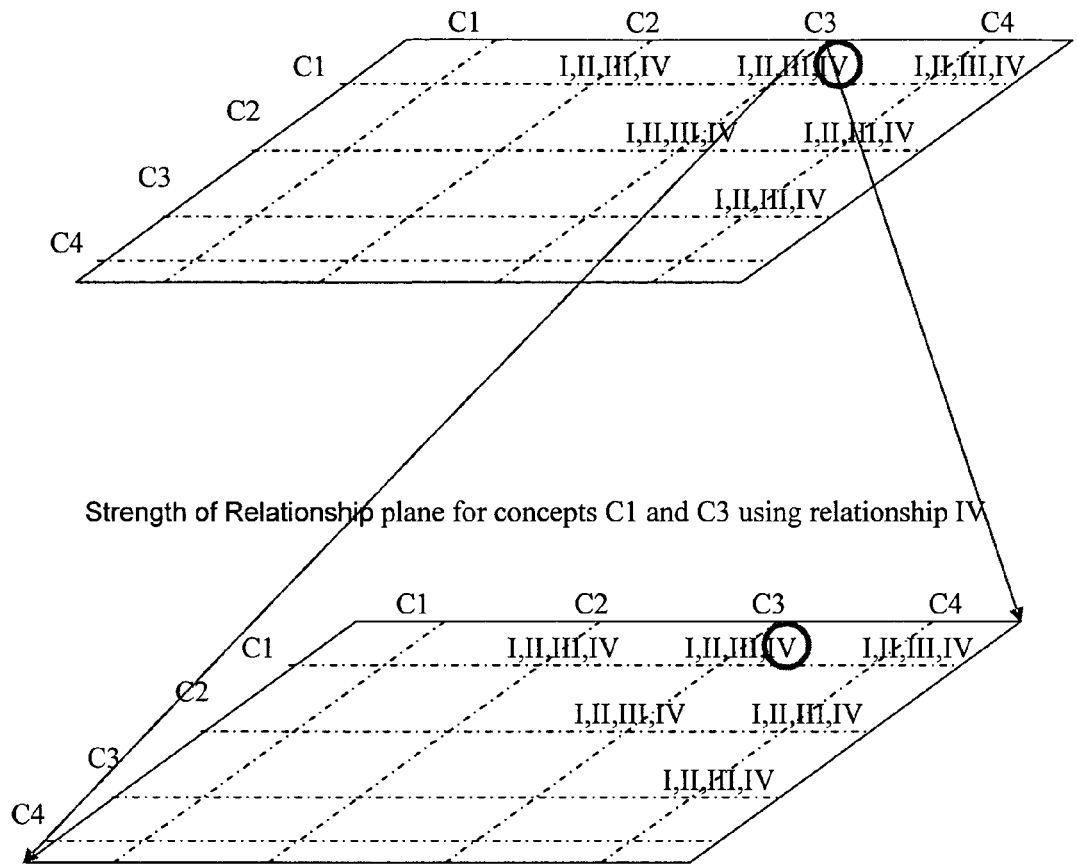
FIG. 6 shows an example generalized representation of a four-concept observed relationship matrix in a two-dimensional planar representation.
Figure 7:
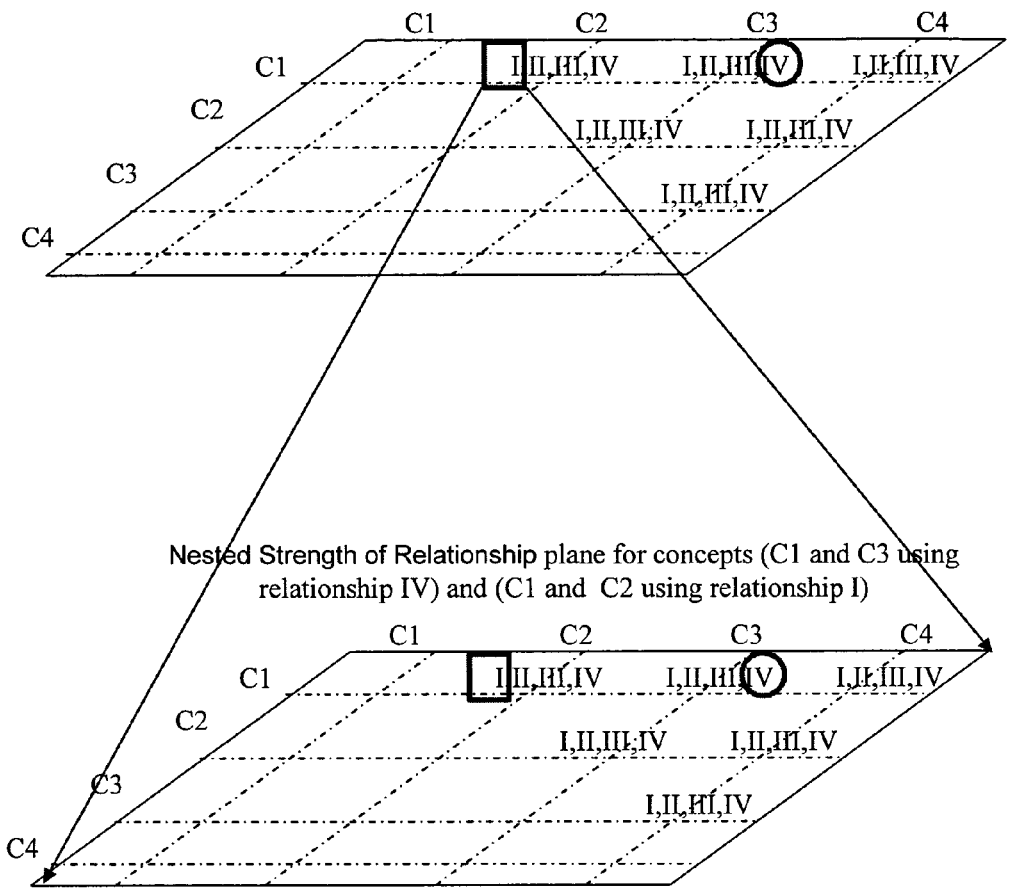
FIG. 7 shows an example generalized representation of a nested four-concept observed relationship matrix in a two-dimensional planar representation with increased complexity in the number of concepts and the relationships between these concepts.

Now consider taking the intersection of concepts C1, C3 using the relationship IV (see the circle in FIG. 6 and FIG. 1 step 121). The nested concept functionality will now examine all documents at this intersection and remove unrelated documents from further consideration. The concepts can be further nested so as to narrow the documents under investigation by adding another intersection with the above nested concept plane. In the example below, the intersection of (C1 and C3 on relationship IV) is taken, with C1 and C2 on relationship I (see the rectangle in FIG. 7 and FIG. 1. The concepts, the relationships, and the corresponding strength of each relationship can be stored in a database (either the same database as used for storing the objects and the index, or in a separate master database) to which other users have access. This process may continue multiple times until all documents found fall in the intersection of these nested planes and there can be no further nesting; otherwise, an empty set of documents will result.

There are three distinct advantages of this nested, flexible arrangements of concepts and their relationships. The first advantage is the greater ease and automation of identifying relationships. Each two-dimensional plane identifies a set of documents and all related relationships. Therefore, each plane can provide a snap shot view of not only the number of concepts present and their $S_R$, but also the type of relationships present among the various concepts and documents. This allows navigation by concept intersections and relationship types, rather than navigation through a typical taxonomy of tree like concepts. This speeds the discovery of the exact document types by not only concepts but also how these concepts interact. Furthermore, the nested nature of moving to the next plane in the drill down clusters concepts in a concept of concepts. This nesting of two-dimensional planes allows multi-conceptual levels of analysis simultaneously from the specific to the most general concept.

The second advantage is the discovery of other concepts that are present when the nested concepts with a particular relationship are examined. At each nested two-dimensional plane, other concepts and their $S_R$'s are displayed showing how other previously unknown concepts are related to known concepts. This knowledge discovery is the most powerful snapshot feature of these nested two-dimensional concept planes.

The third advantage lies in the ability and the flexibility to finely tune concepts through child concepts. Because concepts can be considered strictly, using synonymy, polysemy, or user defined, individual concepts can be corpus- and/or user-specific with well-defined boundaries. These well-defined boundaries can shape more accurate concept clusters in the nested concept two-dimensional planes as well as their relationships. Further, these two-dimensional planes may be used to link concepts across corpora by linking two-dimensional planes. This relational link of nested concept planes across corpora provides insights on how different corpora are related and allow greater scalability as only relevant and compressed information across large disparate and physically separate corpora are compared.

The following process summarizes rules for automatic concept building using a relationship matrix:

Let "a" be a parent concept consisting of child concepts $a_1, a_2, \ldots a_n$. Let "b" be a parent concept consisting of child concepts $b_1, b_2, \ldots b_n$. Let $s_R(x)$ be the strength of the relationship x=aRb, where R is a relation and a, b are arbitrary concepts. The strength is $S_R$ as described below. Let y (0<=y<=1) be an arbitrary threshold value. Let "near" be the distance between two words/phrases as measured by "z" (z is a positive integer).

A compound concept is a concept with one or more embedded Boolean terms. Example: "Intelligenxia" is a simple concept. But (Intelligenxia or Intellicabinet) is a compound concept as the Boolean term "or" is embedded in it.

For each pair of concepts, the strength of the relationship is calculated. There are four commonly used relationship scenarios (as in Table 1 below) for automatically building concepts. Taking "Chevrolet" and "Geo" as examples, then case 1 is (Chevrolet and Geo) as a Boolean expression, case 2 is (Chevrolet near Geo) as a string expression, case 3 is "Chevrolet Geo" as one phrase and case 4 is "Geo Chevrolet" as one phrase. Special characters such as comma, dashes, and underscores are ignored. The first column is the relationship scenario. In this case, relationship R={and, near, (a b), (b a)} where a, b are arbitrary concepts. The second column shows the name of the newly created concatenated concepts. Since the concepts can have different levels and child concepts (please refer to above-referenced co-pending U.S. patent application Ser. No. 10/087,053, incorporated by reference herein in its entirety), the third column is the expansion of the two concatenated concepts with their active child concepts. The fourth column describes the rule used to build the expansion.

TABLE 1

| Case | ParentConcept aka ConceptName | Associated Concepts | Active Concepts |
|---|---|---|---|
| 1 | ab R1 | (a and b) | existing child concepts for a and b from concepts cross reference |
| 2 | ab R2 | (a near b) | existing child concepts for a and b from concepts cross reference |
| 3 | b a | (b a)/(b w/1 a) for compound concept | existing child concepts for a and b from concepts cross reference |
| 4 | a b | (a b)/(a w/1 b) for compound concept | existing child concepts for a and b from concepts cross reference |

Based on the strength of the observed relationship, actions can be taken automatically per Table 1. The actions are described below in pseudocode:

If $S_R(a \text{ and } b)=S_R(a \text{ near } b)=S_R(a\ b)$, then perform case 4 and index the concept against the entire corpus;

If $S_R(a \text{ and } b)=S_R(a \text{ near } b)=S_R(b\ a)$, then perform case 3 and index the concept against the entire corpus;

If $S_R(a \text{ and } b)=>S_R(a \text{ near } b)=>(S_R(a\ b) \text{ or } S_R(b\ a))$, then
  if $S_R(a\ b)>0$ and $S_R(b\ a)=S_R(a \text{ near } b)*y$, then perform case 4 index the concept against the entire corpus; and
  if $S_R(b\ a)>0$ and $S_R(a\ b)=S_R(a \text{ near } b)*y$, then perform case 3 and index the concept against the entire corpus,
end if;

If $S_R(a \text{ and } b)>=S_R(a \text{ near } b)>>(S_R(a\ b) \text{ or } S_R(b\ a))$, then
  if $S_R(a \text{ and } b)<=S_R(a \text{ near } b)*y$, then perform case 2 and index the concept against the entire corpus; and
  if $S_R(a \text{ and } b)>S_R(a \text{ near } b)*y$ then perform case the concept against the entire corpus,
end if.

There is a need for dynamically analyzing search engine results for exceptions, trends, and patterns. While the need to analyze large volumes of data for exceptions, trends and patterns is proven (see, for example, a task of looking for discussion patterns in a discussion group archive, such as that described in above-referenced U.S. patent application Ser. No. 10/087,053, and U.S. patent application Ser. No. 10/393, 677, both incorporated by reference herein in their entirety), there is also a need to dynamically analyze smaller sets of data, such as search results to spot documents of interest or documents with exceptions or find out relationships, patterns, commonalities, differences, trends or other relationships that exist among or between those. As an example, the user can search for "Osama Bin Laden" through a search engine and get 1500 results. In order to find out if there is anything of interest in this corpus (in this context, a corpus is a collection of documents or files), the user's options are:

Option 1: Read the contents one by one to see if there is anything of value and if there are any relationships, patterns, trends or the like worth pursuing. Manually going through the corpus is cumbersome, and can be overwhelming, as it is very difficult (and time consuming) to read each and every one, and to remember every other possible relationship and exception to see which of these emerge as possible trends worth pursuing.

Option 2: Run dynamic taxonomy engines on this data and build a hierarchical structure by organizing the corpus. Since the structure is hierarchical, it is difficult to find relationships that might exist across different hierarchies or some relationships that may fit in any hierarchy. For example, "Osama bin Laden" search results contents can be categorized into topics such as Afghanistan, Terrorism, or in some other way. Within Afghanistan, it can be further sub-categorized into topics such as Service Organization (CIA, etc.). But what if there was a connection between a Service Organization, some other country (such as Iraq) and Terrorism? These are different drill-down paths, and by choosing to drill down on one path, others are excluded.

Option 3: Run dynamic analysis engines on the data and let the engines interactively extract concepts, relationships and patterns of relevance in accordance with the present invention. At a glance, the user will get an idea of concepts that exist in this result set and that might be of importance. The user can then analyze the result set using a relational matrix structure that allows a user to view multiple paths of their choice simultaneously. The benefits of doing this are threefold:

a. The user will often quickly be able to analyze and then find the document or article of interest.

b. If there are additional concepts of importance that the user might not have otherwise realized, it will help the user formulate and build new hypotheses.

c. If no concepts of value are found, then the user can save time by not reading the search results and instead of moving on to other searches.

This view of the data can be taken, and drilled down in multiple ways automatically to see if there is a relationship between two different data sets. Thresholds and exceptions can be set to identify concepts and documents of interest (see, for example, the description in the above-referenced U.S. patent application Ser. No. 10/087,053 and U.S. patent application Ser. No. 10/393,677, both incorporated by reference herein in their entirety). Multi-dimensional analysis and exception identification analysis can be performed on these search results.

The most interesting concepts may be analyzed by examining their frequency of occurrence. This analysis may be visualized as part of a multi-dimensional analysis.

According to one embodiment of the invention, a dynamic analysis of search results is performed using a particular embodiment of the inventive user interface by the user clicking a button called "Analyze Results" or equivalent, at which time the search engine will pass the search query results in an XML (extensible markup language) format to the ACE engine. The XML format is merely an example; one of ordinary skill in the art would recognize many other variations and alternatives. ACE engine refers to the This XML format may or may not contain information regarding the location of the file, any relevant information, author, size or the like information, or it can contain the contents of the file itself. At this point Intelligenxia's engine will process the XML input. Search engine results are composed of one or more textual objects or locations to the physical object. The Intelligenxia engine extracts concepts (based on, for example—but not limited to, the concept extraction method and algorithms described in above-referenced U.S. patent application Ser. No. 10/087,053 and U.S. patent application Ser. No. 10/393,677) and dynamically sets up analysis. It will be appreciated that references to particular file formats such as XML format are merely exemplary and that other file formats either presently existent or to be developed in the future may be utilized. In particular it will be appreciated that XML and extensions and improvements thereof as well as successors thereto may be utilized.

The search results can be added to a master database and master index for further processing. As the collection of successive search results and their index can become very large, immediate analysis and identification of embedded concepts can become difficult or impossible. Steps to dynamically set up analysis are as follows:

Step 1: Get the output of any search results in XML (or other) format, such as EDI (electronic data interchange), CSV (comma separated values), SGML (standard generalized markup language), or any other markup language.

Step 2: Parse the contents of the entire XML search results stream. If the XML stream contains the location of the search result files and these search results are accessible by an analysis engine, then the contents of the search files are not cached. Just the locations of these files are recorded in Intelligenxia's database. If the XML stream contains the search file content, these search results contents are cached as files in an analysis database.

Step 3: Instead of adding this search results data to a master index for subsequent analysis, a quick index can be dynamically built, that includes only the collection of search results from step 2. This quick index helps in the following ways:

a. First, the quick index cuts shorts dramatically the time it takes to analyze the collection. Note that we are now confined to only the results from parsing the XML stream in step 2.

b. Second, the quick index increases the analysis focus to just the corpus resulting from the Parse the XML stream of step 2. This way any trends, exceptions and relationships that are discovered are attributed to the search results collection.

Step 4: Analyze the contents of the collection of search results looking for any embedded concepts. This analysis may be desirable or needed when, for example, the user has no idea about the contents of the corpus, or if the user is looking for relationships, trends and patterns in the corpus. Scanning refers to, for example, any process by which documents, paragraphs, sentences, phrases, words, symbols, speech, electronic signals, or other form of communication are parsed, scanned, or otherwise evaluated to identify or extract concepts, so that conventional reading by a human reader is not required.

Step 5: The extracted key concepts and ideas can be presented in graphical user interface that has either (1) a suggested concepts list, or (2) a concepts matrix, or (3) both. The suggested concepts list is a list of suggested concepts that can be sorted in multiple ways. Some of the possible ways are:

a. Alphabetical: Concepts are presented in ascending or descending alphabetical order.

b. Hits (number of hits or occurrence): Concepts are presented in ascending or descending order of hits (i.e., their frequency of occurrence or how many times the word or phrase or other words/phrases or symbols or sets of symbols that are the parent word/phrase's children occur) in the corpus or search query.

c. Document Count: Concepts are presented in ascending or descending order by the number of objects contained within the corpus in which they occur.

d. Concept rarity: Concepts are presented in ascending or descending order of score calculated using a concepts extraction scoring model algorithm, such as the Intelligenxia concept extraction algorithm described in above-referenced co-pending U.S. patent application Ser. No. 10/087,053 and U.S. patent application Ser. No. 10/393,677, which are incorporated by reference herein. Other concept extraction scoring model algorithms known in the art may alternatively be used. As the score is more dependent on how strong a concept occurs in a document, the sorted order by score reveals concepts that may not occur most frequently but appear as themes of selected group of documents.

Step 6: Having determined or identified: (i) important concepts embedded in the object, and (ii) learned from the collection, the user can now analyze the data by selecting concepts to be analyzed. In one embodiment, the selected concepts will advantageously be viewed in a two-dimensional matrix format where the concepts occur as columns and the documents as rows. The coordinate (n, m) will be occurrence or the number of hits of the concept (n) in the document (m).

Figure 8:
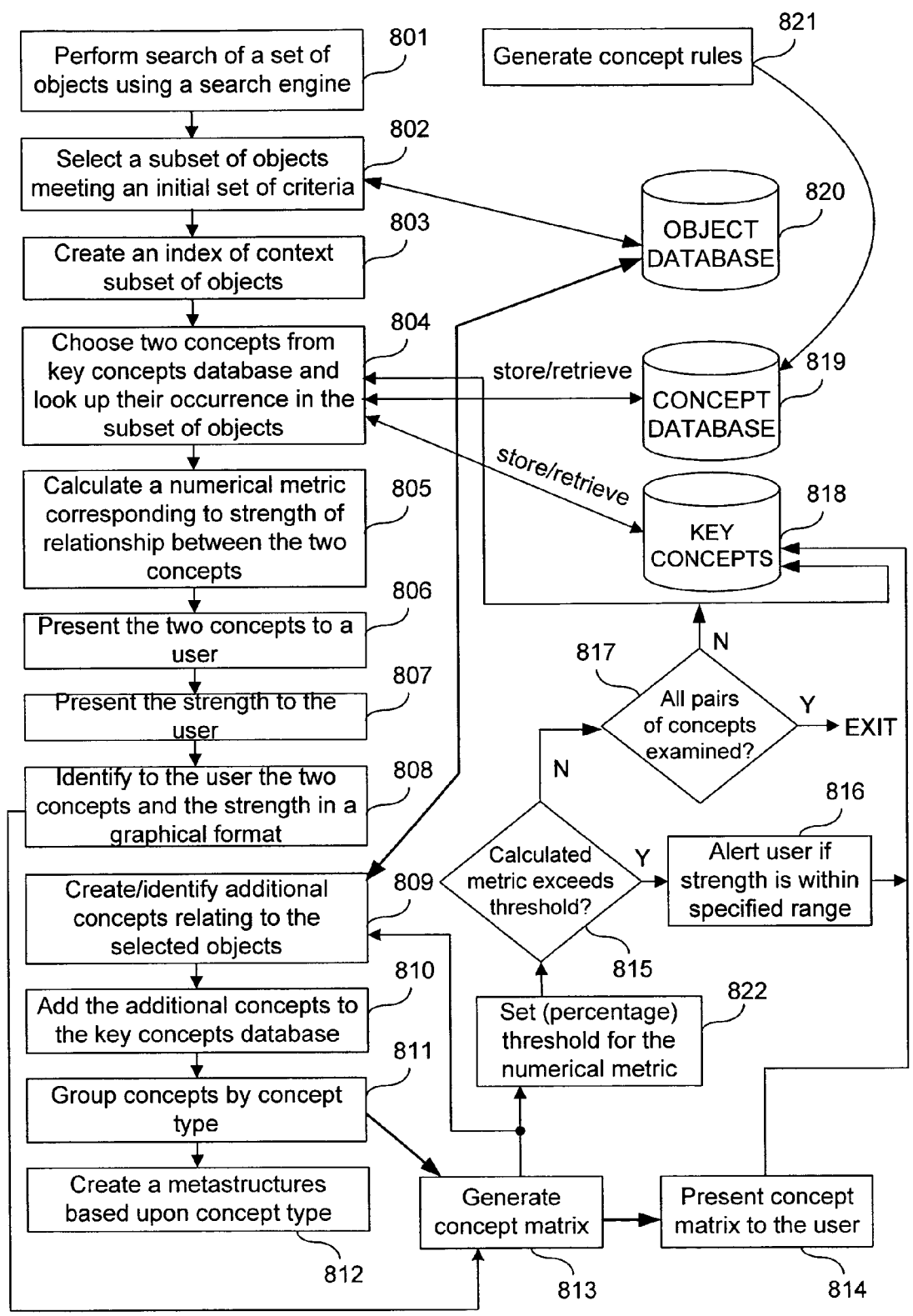
FIG. 8 is a process flow diagram of an embodiment of the present invention.
Figure 9:
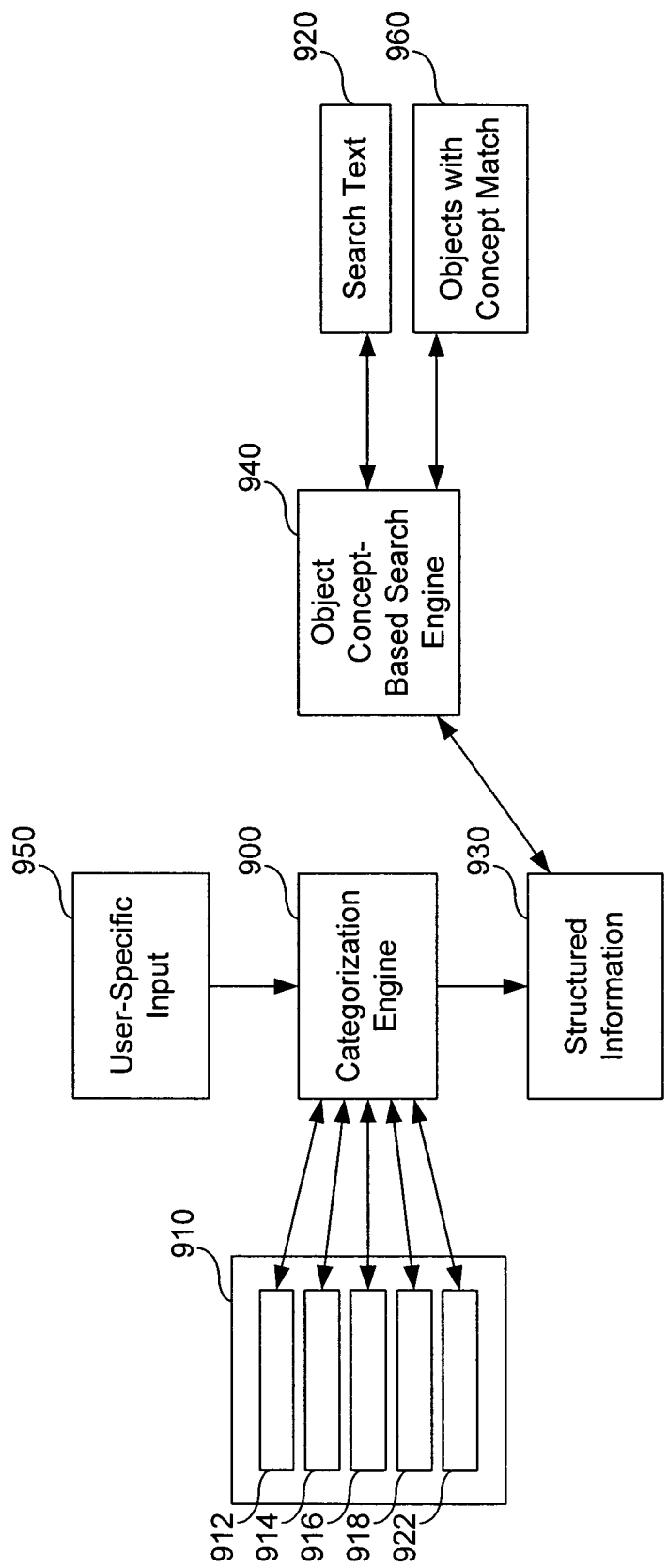
FIGS. 9-14 illustrate one embodiment of a concept extraction mechanism.
Figure 10:
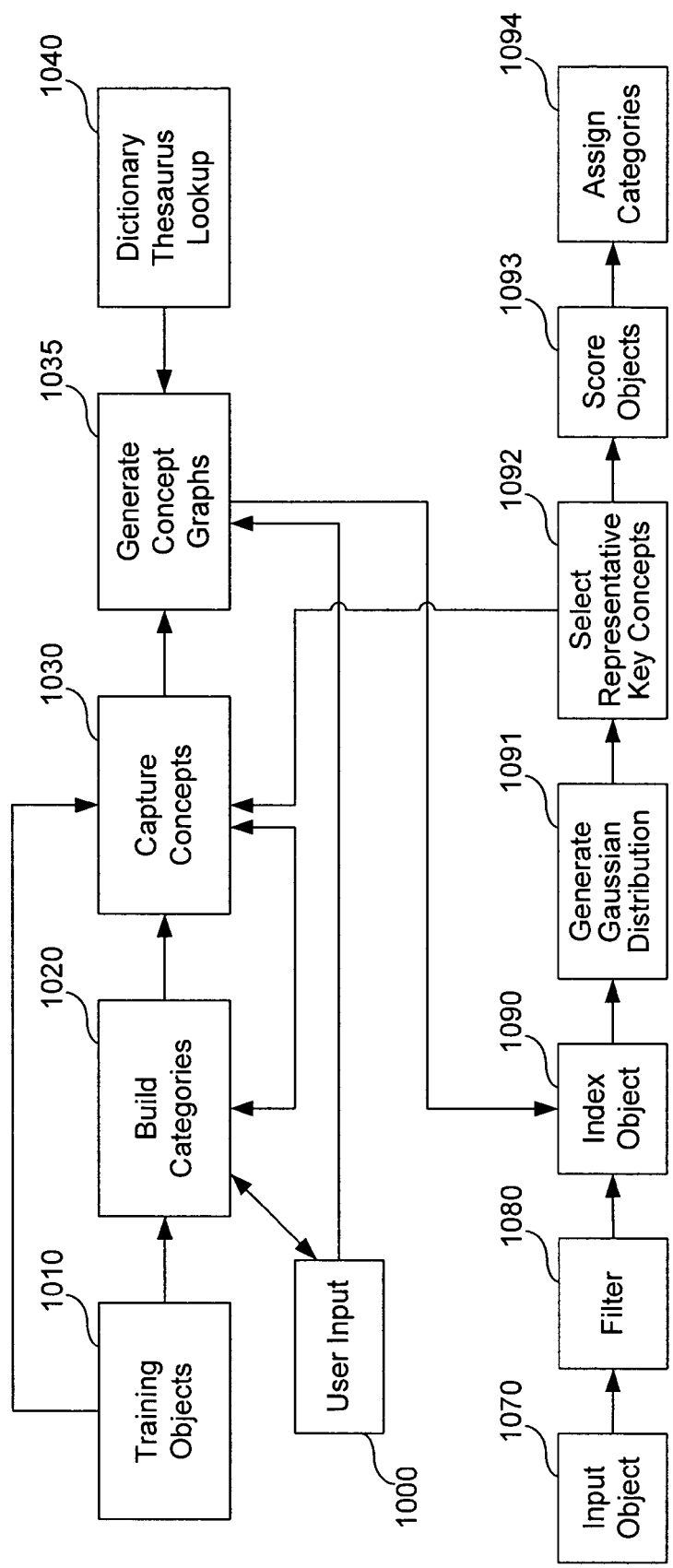

One embodiment of the invention will be summarized with the aid of the flow chart of FIG. 8. As shown in FIG. 8, a search of a "universe" of objects is performed, for example, by using a search engine (step 801). A subset of objects (or, possibly, only one object) is selected as meeting an initial set of criteria (step 802). The selected objects may be stored in a database (step 820). An index is created, that includes location of content within the selected object and optionally metadata relating to the selected objects (step 803). With concept rules generated (step 821), at least two concepts are extracted from the index (step 804). Concepts are stored in a database (step 819). A numerical metric, such as a ratio corresponding to a strength of the relationship between the concepts, is calculated (step 805). Key concepts, such as those that meet a particular strength threshold, are stored in a key concepts database (step 818). The concepts can be presented to a user (step 806). The strength(s) can be presented to a user (step 807). The concepts and the strength(s) may be presented to a user in a graphical format, such as a list or a concept matrix (step 808). Additional concepts may be created or identified (step 809). These additional concepts may be added to the index (step 810), and the concepts grouped by type (step 811). A concept matrix may be generated (step 813) for display to the user (814). A meta-structure may be created based upon the concept type (step 812). A percentage threshold for the metric may be set (step 822). If the metric exceeds the threshold (step 815), the user can be alerted (step 816). If all pairs of concepts are examined (step 817), the process can exit. If there are still pairs of concepts unexamined, the process can return to step 804 (or to step 805), continuing the process of examining relationship strengths between all relevant pairwise concept pairs. It will be appreciated that the steps illustrated in FIG. 8 may be performed in a different order than that illustrated, and that the concepts may be derived from sources other than the index (e.g., they may be supplied by the user, etc.).

It should be noted that the identified concepts can be then be used in the relationship discovery process for building new complex concepts. The concepts identified in the dynamic analysis process can be made available to the trends and exceptions algorithm described in above-referenced co-pending U.S. patent application Ser. No. 10/087,053 and U.S. patent application Ser. No. 10/393,677, which are incorporated by reference herein. Also, although the embodiment described above uses several databases, the information can be stored in a single database, rather than spread among a number of databases.

While various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A computer-readable storage medium comprising code representing instructions to cause a processor to:
    receive, from a user, a first selection indicating a predefined corpus of a plurality of objects, the plurality of objects being of a finite number;
    extract, from the plurality of objects, a plurality of all concepts that occur in the corpus, each concept from the plurality of all concepts being one or more of:
        a part of speech;
        a geographic region;
        a person;
        a group of persons;
        a business unit;
        an organization;
        an action;
        a process;
        a product;
        a service;
        a subject; or
        a category;
    receive, from the user, a second selection indicating a first concept and a second concept from the plurality of all concepts, wherein the first concept includes a seed concept and at least one related concept, and wherein the second concept includes a seed concept and at least one related concept;
    calculate a strength of a relationship between the first user-selected concept and the second user-selected concept, the relationship being based at least in part on a presence of both the first user-selected concept and the second user-selected concept in each of at least a first object and a second object in the corpus, the calculating including receiving, from a user, a proximity value for the first user-selected concept and the second user-selected concept, the proximity value being based at least in part on a number of words occurring between the first user-selected concept and the second user-selected concept within each object from the plurality of objects; and
    identify a third concept when the strength of the relationship exceeds a predetermined threshold, the third concept being the relationship between the first concept and the second concept, the predetermined threshold being based at least in part on a predetermined proximity threshold value, the predetermined proximity threshold value being based at least in part on a number of words between two concepts within an object.

2. The computer-readable storage medium of claim 1, wherein the strength of the relationship is based at least in part on a ratio, the ratio being calculated using at least one of:
- a first ratio of a number of unstructured objects in the corpus in which both the first concept and the second concept occurs to a total number of objects in the corpus;
- a second ratio of a number of unstructured objects in the corpus in which both the first concept and the second concept occur to a number of objects in which any of the first concept and the second concept occurs; or
- a third ratio, the third ratio being based at least in part on a mathematical product of the first ratio and the second ratio.

3. The computer-readable storage medium of claim 1, further comprising code representing instructions to cause a processor to:
- associate each concept from the plurality of concepts with a concept type from a plurality of concept types;
- group each concept from the plurality of concepts by a concept type from the plurality of concept types associated with that concept; and
- define a meta-structure based upon a first concept type from the plurality of concept types.

4. The computer-readable storage medium of claim 1 wherein the relationship is a first relationship, further comprising code representing instructions to cause a processor to:
- if the strength of the first relationship exceeds the predetermined threshold, calculate a strength of a second relationship between another pair of concepts from the plurality of concepts.

5. The computer-readable storage medium of claim 1, further comprising code representing instructions to cause a processor to store the plurality of objects to a database.

6. The computer-readable storage medium of claim 1, further comprising code representing instructions to cause a processor to:
- store the strength of the relationship to a database.

7. The computer-readable storage medium of claim 1, further comprising code representing instructions to cause a processor to:
- notify the user if the strength of the relationship is within a predefined numerical range.

8. The computer-readable storage medium of claim 1, further comprising code representing instructions to cause a processor to:
- display the third concept to a user.

9. The computer-readable storage medium of claim 8, wherein the code to display includes code to display to the user the third concept, the relationship, and the strength of the relationship as a concept matrix.

10. The computer-readable storage medium of claim 8, wherein the code to display includes code to display to the user the third concept, the relationship, and the strength of the relationship as a list.

11. The computer-readable storage medium of claim 8, wherein the code to display includes code to highlight the first concept and the second concept in the first object.

12. The computer-readable storage medium of claim 1, further comprising code representing instructions to cause a processor to:
- define an index that includes a location of the first concept and the second concept within at least one object from the plurality of objects.

13. The computer-readable storage medium of claim 1, further comprising code representing instructions to cause a processor to:
- define an index that includes metadata relating to the plurality of objects.

14. The computer-readable storage medium of claim 1, wherein each object from the plurality of objects is any of: an email, a file, a webpage, a spreadsheet and an image.

15. The computer-readable storage medium of claim 1, wherein the first object and the second object is each selected from a set of search engine results.

16. The computer-readable storage medium of claim 1, further comprising code representing instructions to cause a processor to:
- define a plurality of concept pairs, each concept pair from the plurality of concept pairs including two concepts from the plurality of concepts; and
- calculate, for each concept pair from the plurality of concept pairs, a strength of a relationship based at least in part on a presence of that concept pair in the plurality of objects.

17. The computer-readable storage medium of claim 1, wherein the strength of the relationship is a first strength of the relationship, further comprising code representing instructions to cause a processor to:
- define a concept pair, the concept pair including a fourth concept from the plurality of concepts and the third concept;
- calculate a second strength of a relationship for the concept pair, the second strength of the relationship for the concept pair being based at least in part on a presence of the third concept and the fourth concept in the plurality of objects; and
- determine if the second strength of the relationship for the concept pair exceeds the predetermined threshold.

18. A computer-readable storage medium comprising code representing instructions to cause a processor to:
- receive a first user selection, the first user selection indicating a subset of a plurality of objects, the subset comprising a predefined corpus, the predefined corpus having a plurality of concepts, each concept from the plurality of concepts being one or more of:
  - a part of speech;
  - a geographic region;
  - a person;
  - a group of persons;
  - a business unit;
  - an organization;
  - an action;
  - a process;
  - a product;
  - a service;
  - a subject; or
  - a category;
- extract a plurality of concepts that occur in the corpus;
- receive a second user selection, the second user selection indicating a first user-selected concept and a second user-selected concept from the plurality of concepts, wherein the first user-selected concept includes a seed concept and at least one related concept, and wherein the second user-selected conceit includes a seed conceit and at least one related conceit;
- calculate a strength of a relationship between the first user-selected concept and the second user-selected concept, the relationship being based at least in part on:
  - a presence of both the first user-selected concept and the second user-selected concept in each of at least a first object and a second object in the corpus;
  - a proximity of the first user-selected concept to the second user-selected concept within at least the first object in the corpus, the proximity based on a user-selected proximity value; and
a number of occurrences of the first user-selected concept and the second user-selected concept within the first object in the corpus; and
identify a third concept when the strength of the relationship exceeds a predetermined threshold, the third concept being the relationship, the predetermined threshold being based at least in part on a predetermined proximity threshold value, the predetermined proximity threshold value specifying a number of words between two concepts within an object.

19. The computer-readable storage medium of claim 18, further comprising code representing instructions to cause a processor to:
define a concept pair, the concept pair including a fourth concept from the plurality of all concepts and the third concept;
calculate a second strength of a relationship between the third concept and the fourth concept, the second strength of the relationship between the third concept and the fourth concept being based at least in part on a presence of the third concept and the fourth concept in the corpus; and
identify a fifth concept when the second strength of the relationship between the third concept and the fourth concept exceeds the predetermined threshold, the fifth concept being the second relationship between the third concept and the fourth concept.

20. The computer-readable storage medium of claim 18, wherein the strength of the relationship is calculated based at least in part on:
a frequency of presence of the first concept and the second concept within the corpus; and
a total number of objects from the corpus in which the first concept and the second concept are present.

21. The computer-readable storage medium of claim 18, wherein the strength of the relationship is based at least in part on a ratio, the ratio being calculated using at least one of:
a first ratio of a number of unstructured objects in the corpus in which the relationship occurs to a total number of objects in the corpus;
a second ratio of a number of occurrences of the relationship in the corpus to a number of objects in which any of the first concept and the second concept occurs; or
a third ratio, the third ratio being based at least in part on a mathematical product of the first ratio and the second ratio.

* * * * *